US009836671B2

United States Patent
Gao et al.

(10) Patent No.: US 9,836,671 B2
(45) Date of Patent: Dec. 5, 2017

(54) DISCOVERY OF SEMANTIC SIMILARITIES BETWEEN IMAGES AND TEXT

(71) Applicant: Microsoft Technology Licensing, LLC, Redmond, WA (US)

(72) Inventors: Jianfeng Gao, Woodinville, WA (US); Xiaodong He, Sammamish, WA (US); Saurabh Gupta, Berkeley, CA (US); Geoffrey G. Zweig, Sammamish, GA (US); Forrest Iandola, Berkeley, CA (US); Li Deng, Redmond, WA (US); Hao Fang, Seattle, WA (US); Margaret A. Mitchell, Seattle, WA (US); John C. Platt, Bellevue, WA (US); Rupesh Kumar Srivastava, Lugano (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 14/839,430

(22) Filed: Aug. 28, 2015

(65) Prior Publication Data
US 2017/0061250 A1 Mar. 2, 2017

(51) Int. Cl.
*G06K 9/62* (2006.01)
*G06K 9/52* (2006.01)
(Continued)

(52) U.S. Cl.
CPC ......... *G06K 9/6267* (2013.01); *G06F 17/277* (2013.01); *G06F 17/2785* (2013.01);
(Continued)

(58) Field of Classification Search
CPC .................. G06F 17/30247–17/30262
See application file for complete search history.

(56) References Cited

U.S. PATENT DOCUMENTS 8,775,341 B1   7/2014   Commons
9,098,532 B2   8/2015   Cragun et al.
(Continued)

OTHER PUBLICATIONS

Banerjee et al., "METEOR: An Automatic Metric for MT Evaluation with Improved Correlation with Human Judgments," In Proceedings of ACL Workshop on Intrinsic and Extrinsic Evaluation Measures for Machine Translation and/or Summarization, Jun. 2005, pp. 65-72, 8 pages.
(Continued)

*Primary Examiner* — Brian P Werner

(57) ABSTRACT

Disclosed herein are technologies directed to discovering semantic similarities between images and text, which can include performing image search using a textual query, performing text search using an image as a query, and/or generating captions for images using a caption generator. A semantic similarity framework can include a caption generator and can be based on a deep multimodal similar model. The deep multimodal similarity model can receive sentences and determine the relevancy of the sentences based on similarity of text vectors generated for one or more sentences to an image vector generated for an image. The text vectors and the image vector can be mapped in a semantic space, and their relevance can be determined based at least in part on the mapping. The sentence associated with the text vector determined to be the most relevant can be output as a caption for the image.

21 Claims, 10 Drawing Sheets

(51) Int. Cl.
G06K 9/00 (2006.01)
G06F 17/27 (2006.01)
G06N 3/02 (2006.01)
G06F 17/30 (2006.01)
(52) U.S. Cl.
CPC .... *G06F 17/3069* (2013.01); *G06F 17/30247* (2013.01); *G06K 9/00442* (2013.01); *G06K 9/52* (2013.01); *G06K 9/6215* (2013.01); *G06N 3/02* (2013.01)

(56) References Cited

U.S. PATENT DOCUMENTS

| 9,263,036 | B1 | 2/2016 | Graves |
| 2009/0076797 | A1 | 3/2009 | Yu |
| 2009/0089047 | A1 | 4/2009 | Pell |
| 2009/0204605 | A1 | 8/2009 | Bai |
| 2014/0114643 | A1 | 4/2014 | Baker et al. |
| 2015/0074027 | A1 | 3/2015 | Huang et al. |
| 2017/0060844 | A1 | 3/2017 | He et al. |

OTHER PUBLICATIONS

Barnard et al., "Learning the Semantics of Words and Picture," In Proceedings of International Conference of Computer Vision, Jul. 7, 2001, 8 pages.
Bengio et al., "Advances in Optimizing Recurrent Networks," published May 26, 2013, In Proceedings of IEEE International Conference on Acoustics, Speech and Signal Processing, 5 pages.
Berger et al., "A Maximum Entropy Approach to Natural Language Processing", In Journal of Computational Linguistics, vol. 22, No. 1, Mar. 1, 1996, pp. 39-71, 34 pages.
Carlson et al., "Toward an Architecture for Never-Ending Language Learning," In Proceedings of Twenty-Fourth AAAI Conference on Artificial Intelligence, Jul. 11, 2010, 8 pages.
Celikyilmaz et al., "Enriching Word Embeddings Using Knowledge Graph for Semantic Tagging in Conversational Dialog Systems," published Jan. 19, 2015, In Proceedings of Association for the Advancement of Artificial Intelligence, 4 pages.
Chen et al., "A Primal-Dual Method for Training Recurrent Neural Networks Constrained by the Echo-State Property," published Apr. 14, 2014, In Proceedings of International Conference on Learning Representations, 17 pages.
Chen et al., "Learning a Recurrent Visual Representation for Image Caption Generation," In Proceedings of the Computing Research Repository, Nov. 2014, 2 pages.
Chen et al., "Microsoft COCO Captions: Data Collection and Evaluation Server," In Journal of Computing Research Repository, Apr. 2015, 7 pages.
Chen et al., "Mind's Eye: A Recurrent Visual Representation for Image Caption Generation," In Proceedings of IEEE Conference on Computer Vision and Pattern Recognition, Retrieved on: May 19, 2015, 10 pages.
Chen et al., "NEIL: Extracting Visual Knowledge from Web Data," In Proceedings of IEEE International Conference on Computer Vision, Dec. 1, 2013, pp. 1409-1416, 8 pages.
Chintala, "Understanding Natural Language with Deep Neural Networks Using Torch," published Mar. 3, 2015, In Proceedings of Natural Language Processing, 13 pages.
Dahl et al., "Context-Dependent Pre-trained Deep Neural Networks for Large Vocabulary Speech Recognition," published Jan. 2012, In Journal of IEEE Transactions on Audio, Speech, and Language Processing, vol. 20, No. 1, 13 pages.
Dahl et al., "Large Vocabulary Continuous Speech Recognition with Context-Dependent DBN-HMMS," published May 22, 2011, In Proceedings of IEEE International Conference on Acoustics, Speech and Signal Processing, 4 pages.

Deng et al., "Analysis of Correlation Structure for a Neural Predictive Model with Application to Speech Recognition," published Feb. 1994, In Journal of Neural Networks, vol. 7, Issue 2, 2 pages.
Deng et al., "ImageNet: A Large-Scale Hierarchical Image Database," In Proceedings of IEEE Conference on Computer Vision and Pattern Recognition, Jun. 20, 2009, 8 pages.
Deng et al., "Scalable Stacking and Learning for Building Deep Architectures," published Mar. 25, 2012, In Proceedings of IEEE International Conference on Acoustics, Speech and Signal Processing, 4 pages.
Deng et al., "Sequence Classification using the High-Level Features extracted from Deep Neural Networks," published May 4, 2014, In Proceedings of IEEE International Conference on Acoustics, Speech and Signal Processing, 4 pages.
Divvala et al., "Learning Everything about Anything: Webly-Supervised Visual Concept Learning," In Proceedings of IEEE Conference on Computer Vision and Pattern Recognition, Jun. 24, 2014, 8 pages.
Donahue et al., "Long-term Recurrent Convolutional Networks for Visual Recognition and Description," In Proceedings of IEEE Conference on Computer Vision and Pattern Recognition, Retrieved on: May 19, 2015, 13 pages.
Elliott et al., "Comparing Automatic Evaluation Measures for Image Description," In Proceedings of 52nd Annual Meeting of the Association for Computational Linguistics, Jun. 23, 2014, pp. 452-457, 6 pages.
Elman, "Finding Structure in Time," published Mar. 1990, In Journal of Cognitive Science, vol. 14, Issue 2, 33 pages.
Everingham et al., "The Pascal Visual Object Classes (VOC) Challenge," In International Journal of Computer Vision, vol. 88, Issue 2, Jun. 2010, pp. 303-338, 36 pages.
Fang et al., "From Captions to Visual Concepts and Back," In Proceedings of Computer Vision and Pattern Recognition, Retrieved on: May 19, 2015, 10 pages.
Farhadi et al., "Every Picture Tells a Story: Generating Sentences from Images," In Proceedings of 11th European Conference on Computer Vision, Part IV, Sep. 5, 2010, 14 pages.
Frinken et al., "A Novel Word Spotting Method Based on Recurrent Neural Networks," published Jun. 9, 2011, In Proceedings of IEEE Transactions on Pattern Analysis and Machine Intelligence, vol. 34, Issue 2, 14 pages.
Frome et al., "DeViSE: A Deep Visual-Semantic Embedding Model," In Proceedings of Advances in Neural Information Processing Systems, Dec. 5, 2013, 9 pages.
Gao et al., "Clickthrough-Based Latent Semantic Models for Web Search," published Jul. 24, 2011, In Proceedings of the 34th international ACM SIGIR conference on Research and development in Information Retrieval, 10 pages.
Gao et al., "Clickthrough-Based Translation Models for Web Search: from Word Models to Phrase Models," published Oct. 26, 2010, In Proceedings of the 19th ACM international conference on Information and knowledge management, 10 pages.
Gao et al., "Learning Continuous Phrase Representations for Translation Modeling," published Jun. 22, 2014, In Proceedings of the 52nd Annual Meeting of the Association for Computational Linguistics, 11 pages.
Gao et al., "Modeling Interestingness with Deep Neural Networks," published Oct. 25, 2014, In Proceedings of the Conference on Empirical Methods in Natural Language Processing, 12 pages.
Gao et al., "Smoothing Clickthrough data for Web Search Ranking," published Jul. 19, 2009, In Proceedings of the 32nd international ACM SIGIR conference on Research and development in information retrieval, 8 pages.
Gers et al., "Learning Precise Timing with LSTM Recurrent Networks," published Mar. 1, 2003, In Journal of Machine Learning Research, vol. 3, 29 pages.
Gers et al., "Learning to forget: Continual Prediction with LSTM," published Sep. 7, 1999, In Proceedings of Ninth International Conference on Artificial Neural Networks, vol. 2, 6 pages.
Girshick et al., "Rich Feature Hierarchies for Accurate Object Detection and Semantic Segmentation," In Proceedings of IEEE Conference on Computer Vision and Pattern Recognition, Jun. 24, 2014, 21 pages.

(56) References Cited

OTHER PUBLICATIONS

Gkioxari et al., "Using k-Poselets for Detecting People and Localizing their Keypoints," In Proceedings of IEEE Conference on Computer Vision and Pattern Recognition, Jun. 24, 2014, 8 pages.
Gonzalez-Dominguez et al., "Automatic Language Identification using Long Short-Term Memory Recurrent Neural Networks," published Sep. 14, 2014, In Proceedings of 15th Annual Conference of the International Speech Communication Association, 5 pages.
Graves et al., "Connectionist Temporal Classification: Labelling Unsegmented Sequence Data with Recurrent Neural Networks," published Jun. 25, 2006, In Proceedings of the 23rd International Conference on Machine Learning, 8 pages.
Graves et al., "Hybrid Speech Recognition With Deep Bidirectional LSTM," published Dec. 8, 2013, In Proceedings of IEEE Workshop on Automatic Speech Recognition and Understanding, 6 pages.
Graves, "Sequence Transduction with Recurrent Neural Networks," published Nov. 11, 2012, In Proceedings of Computing Repository Research, 9 pages.
Graves et al., "Speech Recognition with Deep Recurrent Neural Networks," published May 26, 2013, In Proceedings of IEEE International Conference on Acoustics, Speech and Signal Processing, 5 pages.
He et al., "Deep Learning for Natural Language Processing and Related Applications," published May 2015, In Proceedings of IEEE International Conference on Acoustics, Speech, and Signal Processing, 146 pages.
He et al., "Joint Learning of Distributed Representations for Images and Texts," In Proceedings of the Computing Research Repository, Apr. 2015, 8 pages.
Hinton et al., "Deep Neural Networks for Acoustic Modeling in Speech Recognition: the Shared Views of Four Research Groups," published Nov. 2012, In IEEE Signal Processing Magazine, vol. 29, Issue 6, 27 pages.
Hochreiter et al., "Long Short-Term Memory," published Nov. 1997, In Journal of Neural Computation, vol. 9, Issue 8, 32 pages.
Hodosh et al., "Framing Image Description as a Ranking Task: Data, Models and Evaluation Metrics," In Journal of Artificial Intelligence Research, vol. 47, Aug. 2013, pp. 853-899, 47 pages.
Hofmann, "Probabilistic Latent Semantic Analysis," published Jul. 30, 1999, In Proceedings of the Fifteenth Conference on Uncertainty in Artificial Intelligence, 8 pages.
Huang et al., "Learning Deep Structured Semantic Models for Web Search using clickthrough Data," In Proceedings of the 22nd ACM international conference on Conference on information & knowledge management, Oct. 27, 2013, pp. 2333-2338, 6 pages.
Huang et al., "Learning Deep Structured Semantic Models for Web Search Using Clickthrough Data," published Oct. 27, 2013, In Proceedings of the 22nd ACM international conference on Conference on information & knowledge management, 8 pages.
Iyyer et al., "Generating Sentences from Semantic Vector Space Representations," In Proceedings of Advances in Neural Information Processing Systems, Dec. 8, 2014, 5 pages.
Staudemeyer et al., "Evaluating performance of long short-term memory recurrent neural networks on intrusion detection data," published Oct. 7, 2013, In Proceedings of the South African Institute for Computer Scientists and Information Technologists Conference, 7 pages.
Sutskever et al., "Generating Text with Recurrent Neural Networks," published Jun. 28, 2011, In Proceedings of the 28th International Conference on Machine Learning, 8 pages.
Sutskever et al., "On the Importance of Initialization and Momentum in Deep Learning," published Jun. 16, 2013, In Proceedings of the 30th International Conference on Machine Learning, 9 pages.
Sutskever et al., "Sequence to Sequence Learning with Neural Networks," published Dec. 8, 2014, In Proceedings of Twenty-eighth Annual Conference on Neural Information Processing Systems, 9 pages.
Vedantam et al., "CIDEr: Consensus-Based Image Description Evaluation," In Journal of Computing Research Repository, Nov. 2014, 10 pages.
Vinyals et al., "A Picture is Worth a Thousand (coherent) Words: Building a Natural Description of Images," Published on: Nov. 17, 2014, Available at: http://googleresearch.blogspot.in/2014/11/a-picture-is-worth-thousand-coherent.html, 9 pages.
Vinyals et al., "Show and Tell: A Neural Image Caption Generator," In Journal of Computing Research Repository, Nov. 2014, 9 pages.
Viola et al., "Multiple Instance Boosting for Object Detection," In Proceedings Advances in Neural Information Processing Systems, Jan. 2007, 8 pages.
Xu et al., "Show, Attend and Tell: Neural Image Caption Generation with Visual Attention," In Journal of Computing Research Repository, Feb. 2015, 22 pages.
Yang et al., "Corpus-Guided Sentence Generation of Natural Images," In Proceedings of the Conference on Empirical Methods in Natural Language Processing, Jul. 27, 2011, 11 pages.
Yao et al., "I2T: Image Parsing to Text Description," In Proceedings of the IEEE, vol. 98, Issue 8, Jun. 17, 2010, 24 pages.
Yih et al., "Semantic Parsing for Single-Relation Question Answering," In Proceedings of the 52nd Annual Meeting of the Association for Computational Linguistics, Jun. 22, 2014, 6 pages.
Yu et al., "Deep Learning and and Its Applications to Signal and Information Processing [Exploratory DSP]," published Jan. 2011, In Proceedings of IEEE Signal Processing Magazine, vol. 28, Issue 1, 6 pages.
Zitnick et al., "Bringing Semantics into Focus using Visual Abstraction," In Proceedings of the IEEE Conference on Computer Vision and Pattern Recognition, Jun. 23, 2013, 8 pages.
Zitnick et al., "Edge Boxes: Locating Object Proposals from Edges," In Proceedings of 13th European Conference on Computer Vision, Sep. 2014, 15 pages.
Jadhav et al., "Automatic Caption Generation for News Images," In International Journal of Computer Science and Information Technologies, vol. 5, Issue 2, Mar. 2014, 3 pages.
Jarvelin et al., "IR Evaluation Methods for Retrieving Highly Relevant Documents," published Jul. 1, 2000, In Proceedings of the 23rd annual international ACM SIGIR conference on Research and development in information retrieval, 9 pages.
Jia et al., "Caffe: Convolutional Architecture for Fast Feature Embedding," In Proceedings of the ACM International Conference on Multimedia, Nov. 3, 2014, 4 pages.
Karpathy et al., "Deep Fragment Embeddings for Bidirectional Image Sentence Mapping," In Proceedings of Computing Repository Research, Jun. 2014, 9 pages.
Karpathy et al., "Deep Visual-Semantic Alignments for Generating Image Descriptions," In Proceedings of Computing Repository Research, Retrieved on: May 18, 2015, 17 pages.
Kiros et al., "Multimodal Neural Language Models," In Proceedings of NIPS Deep Learning Workshop, Dec. 9, 2013, 9 pages.
Kiros et al., "Unifying Visual-Semantic Embeddings with Multimodal Neural Language Models," In Proceedings of the Computing Research Repository, Nov. 2014, 13 pages.
Krizhevsky et al., "ImageNet Classification with Deep Convolutional Neural Networks," In Proceedings of 26th Annual Conference on Neural Information Processing Systems, Dec. 3, 2012, 9 pages.
Kulkarni et al., "Baby talk: Understanding and Generating Simple Image Descriptions," In Proceedings of IEEE Computer Vision and Pattern Recognition, Jun. 20, 2011, pp. 1601-1608, 8 pages.
Kuznetsova et al., "Collective Generation of Natural Image Descriptions", In Proceedings of the 50th Annual Meeting of the Association for Computational Linguistics: Long Papers—vol. 1, Jul. 8, 2012, pp. 359-368, 10 pages.
Lau et al., "Trigger-Based Language Models: A Maximum Entropy Approach," In Proceedings of IEEE International Conference on Acoustics, Speech, and Signal Processing: speech processing—vol. 2, Apr. 27, 1993, 4 pages.
Lavrenko et al., "A Model for Learning the Semantics of Pictures," In Proceedings of Neural Information Processing Systems, Dec. 8, 2003, 8 pages.
Le et al., "Distributed Representations of Sentences and Documents," published Jun. 21, 2014, In Proceedings of the 31st International Conference on Machine Learning, vol. 32, 9 pages.

(56) References Cited

OTHER PUBLICATIONS

Lebret et al., "Phrase-Based Image Captioning," In Proceedings of Computing Repository Research, Feb. 2015, 9 pages.

Li et al., "Composing Simple Image Descriptions using web-scale n-grams," In Proceedings of the Fifteenth Conference on Computational Natural Language Learning, Jun. 23, 2011, pp. 220-228, 9 pages.

Lin et al., "Automatic Evaluation of Machine Translation Quality Using Longest Common Subsequence and Skip-Bigram Statistics," In Proceedings of the 42nd Annual Meeting on Association for Computational Linguistics, Jul. 21, 2004, 8 pages.

Lin et al., "Microsoft COCO: Common Objects in Context," In Proceedings of 13th European Conference on Computer Vision Part V, Sep. 6, 2014, 16 pages.

Maas et. al., "Learning Word Vectors for Sentiment Analysis," In Proceedings of the 49th Annual Meeting of the Association for Computational Linguistics: Human Language Technologies, Jun. 19, 2011, 9 pages.

Manning, "Deep Learning of Hierarchical Structure", In Proceedings of Learning Workshop, Apr. 13, 2011,1 page.

Mao et al., "Deep Captioning with Multimodal Recurrent Neural Networks (m-RNN)," In Proceedings of 3rd International Conference on Learning Representations, May 7, 2015, 15 pages.

Mao et al., "Explain Images with Multimodal Recurrent Neural Networks," In Proceedings of Computing Repository Research, Oct. 2014, 9 pages.

Maron et al., "A Framework for Multiple-Instance Learning," In Proceedings of Advances in Neural Information Processing Systems, Nov. 30, 1998, 7 pages.

Mesnil et al., "Investigation of Recurrent-Neural-Network Architectures and Learning Methods for Spoken Language Understanding," published Aug. 25, 2013, In Proceedings of 14th Annual Conference of the International Speech Communication Association, 5 pages.

Mikolov et al., "Distributed Representations of Words and Phrases and their Compositionality," published Dec. 5, 2013, In Proceedings of Advances in Neural Information Processing Systems 26, 9 pages.

Mikolov et al., "Efficient Estimation of Word Representations in Vector Space," published Jan. 2012, In Proceedings of the Computing Research Repository, 12 pages.

Mikolov et al., "Recurrent Neural Network Based Language Model," published Sep. 26, 2010, In Proceedings of 11th Annual Conference of the International Speech Communication Association, 4 pages.

Mikolov et al., "Strategies for Training Large Scale Neural Network Language Models," In Proceedings of Automatic Speech Recognition and Understanding Workshop, Dec. 2011, pp. 196-201, 6 pages.

Mitchell et al., "Midge: Generating Image Descriptions from Computer Vision Detections," In Proceedings of the 13th Conference of the European Chapter of the Association for Computational Linguistics, Apr. 23, 2012, pp. 747-756, 10 pages.

"MLlib—Feature Extraction and Transformation", Published on: Oct. 16, 2014, Available at: https://spark.apache.org/docs/1.1.0/mllib-feature-extraction.html, 6 pages.

Mnih et al., "A Fast and Simple Algorithm for Training Neural Probabilistic Language Models," In Proceedings of the 29th International Conference on Machine Learning, Jun. 26, 2012, 8 pages.

Mnih, et al., "Three New Graphical Models for Statistical Language Modelling," In Proceedings of the 24th International Conference on Machine Learning, Jun. 20, 2007, pp. 641-648, 8 pages.

Modaghegh et al., "Learning of Relevance Feedback Using a Novel Kernel Based Neural Network," in Australian Journal of Basic and Applied Sciences, vol. 4, Issue 2, Feb. 2010, 16 pages.

Nesterov, "A Method of Solving a Convex Programming Problem with Convergence Rate O (1/k2)," published Feb. 1983, In Journal of Soviet Mathematics Doklady.

Norman, "Google Develops a Neural Image Caption Generator to Translate Images into Words," Published on: Nov. 17, 2014, Available at: http://historyofinformation.com/expanded.php?id=4768, 2 pages.

Och, "Minimum Error Rate Training in Statistical Machine Translation," In Proceedings of the 41st Annual Meeting on Association for Computational Linguistics—vol. 1, Jul. 7, 2003, pp. 160-167, 8 pages.

Ordonez et al., "Im2Text: Describing Images Using 1 Million Captioned Photographs," In Proceedings of Advances in Neural Information Processing Systems 24, Dec. 12, 2011, 9 pages.

Palangi et al., "Semantic Modelling With Long-Short-Term Memory for Information Retrieval," published Dec. 2014, In Proceedings of the Computing Research Repository, 5 pages.

Papineni et al., "BLEU: a Method for Automatic Evaluation of Machine Translation," In Proceedings of the 40th Annual Meeting of the Association for Computational Linguistics, Jul. 2002, pp. 311-318, 8 pages.

Pascanu et al., "On the Difficulty of Training Recurrent Neural Networks," published Jun. 16, 2013, In Proceedings of the 30th International Conference on Machine Learning, 12 pages.

Ramnath et al., "AutoCaption: Automatic Caption Generation for Personal Photos," In Proceedings of IEEE Winter Conference on Applications of Computer Vision, Mar. 24, 2014, 8 pages.

"Rapid Progress in Automatic Image Captioning", Published on: Nov. 18, 2014, Available at: http://blogs.technet.com/b/machinelearning/archive/2014/11/18/rapid-progress-in-automatic-image-captioning.aspx, 5 pages.

Rashtchian et al., "Collecting Image Annoations Using Amazon's Mechanical Turk," In Proceedings of the NAAC HLT Workshop on Creating Speach and Language Data with Amazon's Mechanical Turk. Jun. 6, 2010, pp. 139-147, 9 pages.

Ratnaparkhi, "Trainable Approaches to Surface Natural Language Generation and their Application to Conversational Dialog Systems," In Proceedings of Computer Speech & Language, vol. 16, Issues 3-4, Jul. 2002, Abstract only, 2 pages.

Ratnaparkhi, "Trainable Methods for Surface Natural Language Generation", In Proceedings of the 1st North American chapter of the Association for Computational Linguistics conference, Apr. 29, 2000, pp. 194-201, 8 pages.

Robinson, "An Application of Recurrent Nets to Phone Probability Estimation," In Proceedings of IEEE Transactions on Neural Networks, vol. 5, Issue 2, 16 pages.

Sak et al., "Long Short-Term Memory Based Recurrent Neural Network Architectures for Large Vocabulary Speech Recognition," published Feb. 2014, In Proceedings of the Computing Research Repository, 5 pages.

Sak et al., "Long Short-Term Memory Recurrent Neural Network Architectures for Large Scale Acoustic Modeling," published Sep. 14, 2014, In Proceedings of 15th Annual Conference of the International speech Communication Association, 5 pages.

Shen et al., "A Latent Semantic Model with Convolutional-Pooling Structure for Information retrieval," In Proceedings of the 23rd ACM International Conference on Conference on Information and Knowledge Management, Nov. 3, 2014, 10 pages.

Simonyan et al., "Very deep Convolutional Networks for Large-scale Image Recognition," In Proceedings of the Computing Research Repository, Sep. 2014, 14 pages.

Socher et al., "Grounded compositional semantics for finding and describing images with sentences," In Proceedings of NIPS Deep Learning Workshop, Dec. 9, 2013, 12 pages.

U.S. Appl. No. 14/839,281, Office Action dated Jun. 7, 2017, 18 pgs.

DISCOVERY OF SEMANTIC SIMILARITIES BETWEEN IMAGES AND TEXT

BACKGROUND

Captions associated with images are useful in various contexts. For example, captions can be used to "explain" or annotate a scene in an image. In another example, a caption generated by a computer can be used to determine if the computer has properly analyzed, or "understands," the image. Determining the context of the image often requires determining the contents of the image (i.e. subjects, objects, and the like), as well as various aspects of a scene in an image such as any actions occurring in the image, the relation of objects within the image to each other, and the like.

SUMMARY

Disclosed herein are technologies for discovering semantic similarities between images and text. Such techniques can be useful for performing image search using a textual query or text search using an image as a query or for generating captions for images. Examples of the technologies disclosed herein use a deep multimodal similarity model ("DMSM"). The DMSM learns two neural networks that map images and text fragments to vector representations, respectively. A caption generator uses the vector representations to measure the similarity between the images and associated texts. The caption generator uses the similarity to output a caption that has the highest probability of being associated with a particular image based on data associated with a training set and as used in the DMSM. In some examples, the use of the DMSM for generating captions for images can increase the accuracy of automatic caption generators, while also reducing the amount of human effort required to generate or correct captions.

This Summary is provided to introduce a selection of technologies in a simplified form that are further described below in the Detailed Description. This Summary is intended to be used as an aid in determining the scope of the claimed subject matter. The term "technologies," for instance, can refer to system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

BRIEF DESCRIPTION OF THE DRAWINGS

The detailed description is described with reference to the accompanying figures. The same reference numbers in different figures indicate similar or identical items.

DETAILED DESCRIPTION

This disclosure is directed to technologies and systems for discovering semantic similarities between images and text. The techniques and systems described herein can be implemented in a number of ways. Examples are provided below with reference to the following figures. The examples and illustrations described herein can be combined.

Overview

This technologies and systems for discovering semantic similarities between images and text as described herein can be useful for performing image search using a textual query, performing text search using an image as a query, for generating captions for images, etc. In various described examples, the technologies and systems employ a deep multimodal similarity model. According to various examples, a caption generator can receive an image, analyze the image, determine a set of words having a certain probability of being associated with the image, and generate a ranked set of sentences from the set of words. In examples, the set of sentences are re-ranked using a deep multimodal similarity model. In examples, a deep multimodal similar model uses a combination of an image model and a text model to determine a probability of the text as defined by the text model of each of the sentences being relevant to the image as defined by the image model. The sentence, or one or more sentences, having the highest probability of being relevant to the image is selected as the caption for the text.

Some examples can provide assistance to a user by providing one or more captions that can be used with an image. Such assistance can help reduce time or effort associated with associating text with an image. Some examples can provide a user interface that displays one or more example captions and provides selectable controls that help a user select the one or more captions to use. These aspects can result in more accurate image captions as well as reduce the time and effort by either a human or a computer to caption images.

Example Environment

Figure 1:
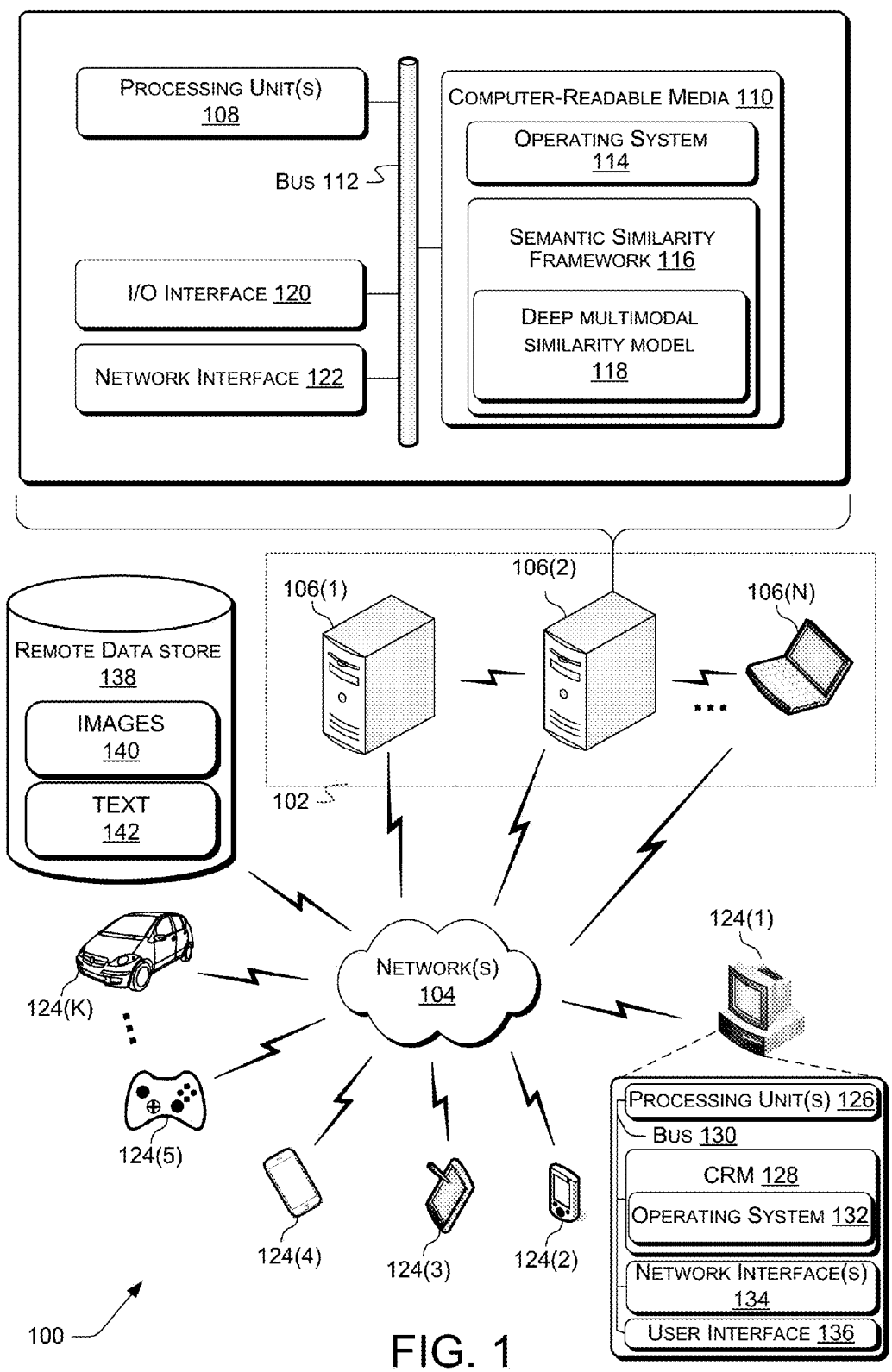
FIG. 1 is a block diagram depicting an example environment in which examples of discovery of semantic similarity between images and text can be implemented.

FIG. 1 shows an example environment 100 in which discovering semantic similarities between images and text, which can include performing image search using a textual query, performing text search using an image as a query, and/or generating captions for images using a deep multimodal similarity model can be implemented. The environment 100 described constitutes but one example and is not intended to limit the claims to any one particular operating environment. Other environments can be used without departing from the spirit and scope of the claimed subject matter. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop and laptop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

CRM described herein, e.g., CRM 110, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106 and/or consumer computing device 124.

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 110 can include, for example, an operating system 114, a semantic similarity framework 116, a deep multimodal similarity model 118, and other modules, programs, or applications that are loadable and executable by processing units(s) 108. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 106 can also include one or more input/output (I/O) interfaces 120 to allow device 100 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). For simplicity, other components are omitted from the illustrated device 106.

Device 106 can also include one or more network interfaces 122 to enable communications between computing device 106 and other networked devices such as consumer computing device(s) 124, also called a user device, through which a consumer or user can submit an input (e.g., a query, question, request for information, etc.). Such network interface(s) 122 can include one or more network interface controllers (NICs) or other types of transceiver devices to send and receive communications over a network. The consumer computing device 124 and/or device 106, in some examples, can be part of a distributed computing architecture.

Other devices involved in discovering semantic similarities between images and text, which can include performing image search using a textual query, performing text search using an image as a query, and/or generating captions for images using a deep multimodal similarity model can include consumer computing devices 124(1)-124(N). Consumer computing device(s) 124 can belong to a variety of categories or classes of devices such as traditional consumer-type devices, desktop computer-type devices, mobile devices, special purpose-type devices, embedded-type devices, and/or wearable-type devices. Thus, although illustrated as mobile computing devices, which can have less computing resources than device(s) 106, consumer computing device(s) 124 can include a diverse variety of device types and are not limited to any particular type of device. Consumer computing device(s) 124 can include, but are not limited to, server computers or blade servers such as Web servers, map/reduce servers or other computation engines, or network-attached-storage units (e.g., 124(1)), laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices (e.g., 124(2), represented graphically as a PDA), tablet computers or tablet hybrid computers (e.g., 124(3)), smartphones, mobile phones, mobile phone-tablet hybrid devices, or other telecommunication devices (e.g., 124(4)), portable or console-based gaming devices or other entertainment devices such as network-enabled televisions, set-top boxes, media players, cameras, or personal video recorders (PVRs) (e.g., 124(5), represented graphically as a gamepad), automotive computers such as vehicle control systems, vehicle security systems, or electronic keys for vehicles (e.g., 124(K), represented graphically as an automobile), desktop computers (e.g., 124(1)), or integrated components for inclusion in computing devices, appliances, or other computing devices configured to participate in or carry out solution discovery by semantic representation optimization as described herein. In some examples, a consumer computing device 124 can be categorized as a stationary device, a mobile device, or an embedded device. Examples of a stationary device include, but are not limited to, desktop computing devices, server computing devices, a dedicated gaming console, and the like. Examples of mobile devices include, but are not limited to, a laptop computer, a notebook computer, an ultra-portable computer, a netbook computer, or a computing device such as a "smart" mobile telephone, a tablet device, a slate device, a portable video game device, or the like. Examples of embedded devices include, but are not limited to, internet-enabled televisions, automobiles, appliances, and the like. It should be appreciated that technologies described herein are not limited to requiring a consumer computing device 124 to be in communication with a device 106 via the network 104, as aspects described herein can be implemented fully or partially on the consumer computing device 124 without the device 106.

Consumer computing device(s) 124 can represent any type of computing device having one or more processing unit(s) 126 operably connected to computer-readable media (CRM) 128 such as via a bus 130, which in some instances can include one or more of a system bus, a data bus, an address bus, a PCI bus, a Mini-PCI bus, and any variety of local, peripheral, and/or independent buses.

Executable instructions stored on CRM 128 can include an operating system 132 and other modules, programs, or applications that are loadable and executable by processing units(s) 126. Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Consumer computing device 124 can also include one or more I/O interfaces including one or more network interfaces 134 and user interfaces 136 to enable communications between consumer computing device 124 and other networked devices such as other consumer computing device(s) 124 or devices 106 over network(s) 104. Such network interface(s) 134 can include one or more network interface controllers (NICs) or other types of transceiver devices to send and receive communications over a network.

Consumer computing device 124 can also include a user interface 136 to enable the device 124 to receive user input and a response to the input. Examples support the user interface 136 receiving input from the user, such as, for example, a query. Additionally or alternatively, the user interface 136 can provide a display of the annotated images, examples of annotated text, and other outputs not explicitly disclosed herein.

In some examples, consumer computing device 124 and/or devices 106(1)-106(N) of distributed computing resources 102 can also access a remote data store 138 through the network 104. The remote data store 138 can be a repository for the persistent storage of various types of files or data. The remote data store 138 can be a repository for data such as images 140 and/or text 142. The images 140 can be one or more data files representative of something in a visual context. The text 142 can be one or more data files representative of a character, phrase, words, sentence, and the like in a textual context.

Figure 2:
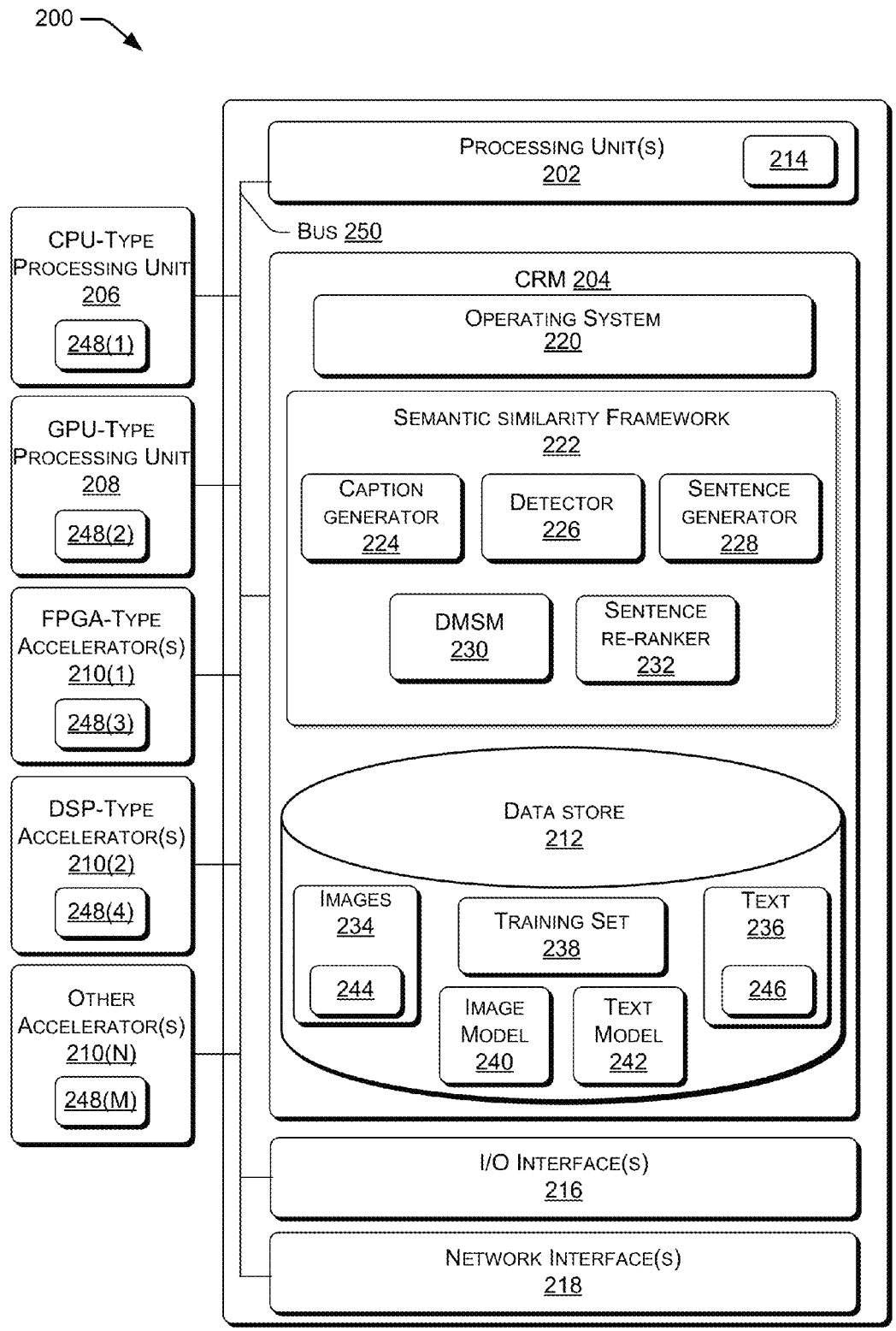
FIG. 2 is a block diagram depicting an example computing device configured to participate in discovering semantic similarities between images and text.

FIG. 2 is a block diagram depicting an example computing device 200 configured to participate in a system for discovery of semantic similarities between images and text. In some examples, computing device 200 may be one computing device of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, CRM 204 can represent CRM 110 and can store instructions executable by the processing unit(s) 202, which as discussed above, can represent a processing unit incorporated in device 200. CRM 204 can also store instructions executable by external processing units such as by an external CPU-type processing unit 206, an external GPU-type processing unit 208, and/or executable by an external accelerator 210, such as an FPGA-type accelerator 210(1), a DSP-type accelerator 210(2), or any other accelerator 210(N). In various examples at least one CPU-type processing unit, GPU-type processing unit, and/or accelerator is incorporated in device 200, while in some examples one or more of a CPU-type processing unit, GPU-type processing unit, and/or accelerator is external to device 200.

In the illustrated example, CRM 204 also includes a data store 212. The data store 212 can be a repository for the persistent storage of various types of files or data. In some examples, data store 212 includes data storage such as a database, data warehouse, or other type of structured or unstructured data storage. In some examples, data store 212 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 212 can store data and/or instructions for the operations of processes, applications, components, and/or modules stored in CRM 204 and/or executed by processing unit(s) 202. Data store 212 can act as a repository for other data, explained in more detail below.

Alternately, some or all of the above-referenced data and/or instructions can be stored on separate memories 214 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 216, which can be I/O interface 120 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 218, which can be network interface(s) 122, can represent, for example, network interface controllers (NICs) or other types of transceiver devices to send and receive communications over a network.

In the illustrated example, CRM 204 also includes an operating system 220, which can include operating system 114. CRM 204 also includes a semantic similarity framework 222, which can include semantic similarity framework 116. Semantic similarity framework 222 can include one or more modules and/or APIs, which are illustrated as blocks 224, 226, 228, 230, 232, 234, and 236 although this is just an example, and the number can vary higher or lower. Functionality described associated with blocks 224, 226, 228 230, 232, 234, and 236 can be combined to be performed by a fewer number of modules and/or APIs or it can be split and performed by a larger number of modules and/or APIs. Moreover, data store 212 can include one or more types of data, which are illustrated as blocks 234, 236, 238, 240, 242, 244, and 246 although this is just an example, and the number can vary higher or lower. Data described associated with blocks 234, 236, 238, 240, 242, 244, and 246 can be combined to be stored in a fewer number of files or partitions or it can be split and stored in a larger number of files or partitions.

Semantic similarity framework 222 can access data from data store 212, which can serve as a repository for data such as images 234 and text 236. The images 234 can be one or more data files representative of something in a visual context. The text 236 can be one or more data files representative of a character, phrase, words, sentence, and the like in a textual context. In some instances, semantic similarity framework can access data from a remote data store, such as remote data store 138.

In some examples, the data store 212 can act as a repository for a training set of data 238. The training set of data 238 is the corpus of data used by a caption generator 224, explained in more detail below. In some examples, the training set of data 238 can be generated by human and/or computer input, whereby the human or computer act as "teachers." For example, one or more images can be presented and one or more words can be selected as being associated with each of the one or more images. The training set of data 238 can be used by the caption generator 224 for relativistic calculations. In some examples, the training set of data 238 can include images with more than one word (e.g. a phrase) associated with the image that act as a caption to the image. The words of the training set of data 238 can include different word types, including, but not limited to, nouns, verbs, and adjectives.

In some examples, the learning process used to generate the training set of data 238 can be weakly supervised learning, whereby a limited amount of data is used. In some examples, the training set of data 238 includes previously generated captions and their associated images. In other examples, the training set of data 238 includes a combination of previously generated captions and their associated images along with other types of training methods. The presently disclosed subject matter is not limited to any particular technology or methodology for generating the training set of data 238. The training set of data 238 can be used to generate captions by the caption generator 224.

In examples, the caption generator 224 can receive an image 244. The image 244 can be received from various sources. In some examples, a consumer device, e.g., a device 124, can receive one or more images 244 via an upload initiated from a user interface 136. In some examples, device 200, e.g., a device 106, can receive one or more images 244 from another device 200 and/or from a consumer device, e.g., a device 124 via a network such as network 104. The image 244 can be a data file that includes visual representations of objects, people, and the like. The presently disclosed subject matter is not limited to any particular type of image.

The caption generator 224 can invoke a detector 226. The detector 226 can analyze the image 244 and determine one or more words 246 associated with the image 244. In examples, the words 246 are selected from the text 236 having a certain probability to be associated with the image 244. The words 246 can be determined using the training set of data 238. The image 244 can be analyzed by the detector 226 by finding similar images in the training set of data 238 and return the words 246 associated with the similar images. In some examples, the number of possible words 246 can be limited to reduce the sample set of the training set of data 238. In some examples, the number of possible words 246 from which captions can be generated can be limited to approximately 500, 1000, 1500, or another predetermined number words. The number of words 246 can represent the words most associated with the image 244.

Alternatively, some or all of the above-referenced data can be stored on separate memories 248, such as memory 248(1) on board a CPU-type processing unit 206, memory 248(2) on board a GPU-type processing unit 208, memory 248(3) on board an FPGA-type accelerator 210(1), memory 248(4) on board a DSP-type accelerator 210(2), and/or memory 248(M) on board another accelerator 210(N).

Bus 250, which can include bus 112, and which in some instances can include one or more of a system bus, a data bus, an address bus, a PCI bus, a Mini-PCI bus, and any variety of local, peripheral, and/or independent buses, can operably connect CRM 204 to processing unit(s) 202.

The caption generator 224 can invoke a sentence generator 228. The sentence generator 228 can receive as an input the possible words associated with an image 244 from the detector 226 and generate one or more sentences from the possible words. There can be various technologies or methodologies to generate sentences from the words 246. In some examples, a maximum entropy ("ME") language model ("LM") can be used. The ME LM can be conditioned on the words 246 that were visually detected. The ME LM can estimate the probability of a word $w_l$ conditioned on the preceding words $w_1, w_2, \ldots, w_{l-1}$, as well as the set of words with high likelihood detections $\mathcal{V}_l \subset \mathcal{V}$ that have yet to be mentioned in a sentence. The motivation of conditioning on the unused words can be to encourage all the words to be used, while avoiding repetitions. The top 15 most frequent closed-class words can be removed from the set $\mathcal{V}$ since they are detected in nearly every image (and can be trivially generated by the ME LM). In some examples, the top 15 frequent closed-class words can be "a," "on," "of," "the," "in," "with," "and," "is," "to," "an," "at," "are," "next," "that," and "it."

In some examples, the detected words 246 can be noisy. Thus, when the end of sentence token is being predicted, the set of remaining words can still contain some words with a high confidence of detection. Following the definition of an ME LM, the word probability conditioned on preceding words and remaining objects can be written as Equation (1):

$$Pr(w_l = \overline{w}_l \mid \overline{w}_{l-1}, \ldots, \overline{w}_1, <s>, \tilde{\mathcal{V}}_{l-1}) = \frac{\exp\left[\sum_{k=1}^{K} \lambda_k f_k(\overline{w}_l, \overline{w}_{l-1}, \ldots, \overline{w}_1, <s>, \tilde{\mathcal{V}}_{l-1})\right]}{\sum_{v \in \mathcal{V} \cup </s>} \exp\left[\frac{\sum_{k=1}^{K} \lambda_k f_k}{(v, \overline{w}_{l-1}, \ldots, \overline{w}_1, <s>, \tilde{\mathcal{V}}_{l-1})}\right]} \quad (1)$$

where $<s>$ denotes the start-of-sentence token, $w_l \in \mathcal{V} \cup </s>$ the remaining words, and $f_k(w_l, \ldots, w_1, \mathcal{V}_{l-1})$ and $\lambda_k$ respectively denote the k-th max-entropy (ME) feature and its weight. The basic discrete ME features that can be used are summarized in Table 1:

TABLE 1

Features used in the maximum entropy language model.

| Feature | Type | Definition | Description |
|---|---|---|---|
| Attribute | 0/1 | $\overline{w}_l \in \tilde{\mathcal{V}}_{l-1}$ | Predicted word is in the attribute set, i.e. has been visually detected and not yet used. |
| N-gram+ | 0/1 | $\overline{w}_{l-N+1}, \ldots, \overline{w}_l =$ κ and $\overline{w}_l \in \tilde{\mathcal{V}}_{l-1}$ | N-gram ending in predicted word is κ and the predicted word is in the attribute set |
| N-gram− | 0/1 | $\overline{w}_{l-N+1}, \ldots, \overline{w}_l =$ κ and $\overline{w}_l \notin \tilde{\mathcal{V}}_{l-1}$ | N-gram ending in predicted word is κ and the predicted word is not in the attribute set. |
| End | 0/1 | $\overline{w}_l = $ κ and $\tilde{\mathcal{V}}_{l-1} = \emptyset$ | The predicted word is κ and all attributes have been mentioned. |
| Score | R | score($\overline{w}_l$) when $\overline{w}_l \in \tilde{\mathcal{V}}_{l-1}$ | The log-probability of the predicted word when it is in the attribute set. |

These features can form a "baseline" system. In some examples, it can be effective to extend this with a "score" feature, which evaluates to the log-likelihood of a word according to the corresponding visual detector. Other techniques can be used, such as, but not limited to, distant bigram features and continuous space log-bilinear features.

To train the ME LM, the objective function is the log-likelihood of the captions conditioned on the corresponding set of detected objects, illustrated in Equation (2):

$$L(\Lambda) = \sum_{s=1}^{S} \sum_{l=1}^{\#(s)} \log Pr(\overline{w}_l^{(s)} \mid \overline{w}_{l-1}^{(s)}, \ldots, \overline{w}_1^{(s)}, <s>, \tilde{\mathcal{V}}_{l-1}^{(s)}) \quad (2)$$

where the superscript (s) denotes the index of sentences in the training set of data 238, and #(s) denotes the length of the sentence. A noise contrastive estimation (NCE) technique can be used to accelerate the training by avoiding the calculation of the exact denominator of Equation (1). In the generation process, unnormalized NCE likelihood estimates can be used. In some examples, unnormalized NCE likelihood estimate can be more efficient than exact likelihoods, and produce very similar outputs. In some examples, ME features can be implemented in a hash table. In some examples, N-gram features up to 4-gram and 15 contrastive samples in NCE training can be used.

In some examples, during sentence generation by the sentence generator 228, a left-to-right beam search can be used. A left-to-right beam search can maintain a stack of length l partial hypotheses. At steps in the search, the path on the stack is extended with a set of likely words, and the resulting length l+1 paths are stored. The top k length l+1 paths are retained and the others pruned away. Possible extensions to be the end of sentence can be defined as token </s>, the 100 most frequent words, the set of attribute words that remain to be mentioned, and all the words in the training set of data 238 that have been observed to follow the last word in the hypothesis. Pruning is based on the likelihood of the partial path. When </s> is generated, the full path to </s> is removed from the stack and set aside as a completed sentence. The process continues until a maximum sentence length L is reached.

After obtaining the set of completed sentences C, an M-best list can be formed as follows. Given a target number of T image attributes to be mentioned, the sequences in C covering at least T objects are added to the M-best list and are sorted in descending order by the log-probability. If there are less than M sequences covering at least T objects found in C, T can be reduced by 1 until M sequences are found. The result is a ranked set (or list) of sentences.

The caption generator 224 can invoke a sentence re-ranker 232 to re-order or re-rank the sentences forming the set of sentences. The sentence re-ranker 232 can use the deep multimodal similarity model ("DMSM") 230. In some examples, the DMSM 230 models global similarity between images and text. In examples, the DMSM 230 learns two neural networks that map images and text fragments to vector representations of the same size. The similarity between images and text can be measured by measuring the cosine similarity between their corresponding vectors.

In some examples, the DMSM 230 uses a pair of neural networks, an image model 240 and a text model 242, one for mapping each input modality to a common semantic space, which are trained jointly. During training, the data consists of a set of image/caption pairs. The training can generate the training set of data 238. A loss function minimized during training represents the negative log posterior probability of the caption given the corresponding image. Thus, an objective can be to learn the parameters of the image and text networks such that if a caption describes an image, their representations have high cosine similarity. These and other aspects of the DMSM 230, image model 240, and text model 242 are explained in more detail in FIGS. 3-8, below.

Example of a DMSM Using an Image Model and a Text Model

Figure 3:
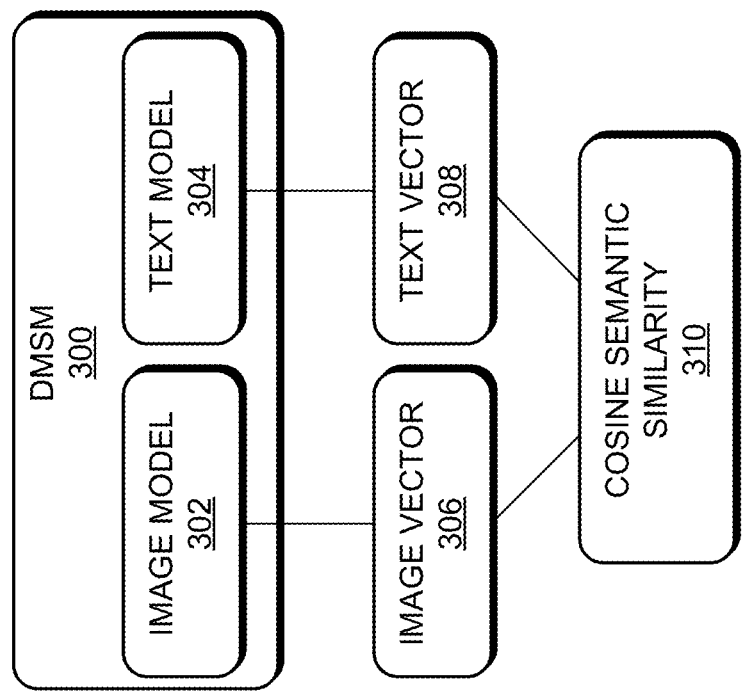
FIG. 3 is an overview of a deep multimodal similarity model.

FIG. 3 is an overview of a DMSM 300, which in some cases can represent the DMSM 230. The DMSM 300 can be used to estimate similarity between an image and a sentence. In examples, the DMSM 300 can uses a pair of neural network models, image model 302, such as image model 240, and text model 304, such as text model 242. As illustrated in FIG. 3, image model 302 and text model 304 are included in DMSM 300, but in some examples they may be separate as shown in FIG. 2.

The image model 302 can map an image representation to an image vector 306 in a hidden space. The text model 304 can map a text vector 308 in the same hidden space. The similarity between the image and the sentence can be computed as the cosine distance between the image vector 306 and the text vector 308. The computed cosine distance can be outputted as a cosine semantic similarity 310. The cosine semantic similarity 310 of each of the sentences inputted into the DMSM 300 can be compared to determine a sentence having the highest similarity (i.e. the image vector 306 and the text vector 308 are more similar than other sentences for the same image). In some examples, the cosine semantic similarity 310 can be defined to be the relevance of the image vector 306 to the text vector 308. As used herein, relevance means that the text and image are semantically similar. It is noted that relevance can be defined using other technologies, such as, but not limited to, Euclidean distance between the image vector 306 and the text vector 308.

Figure 4:
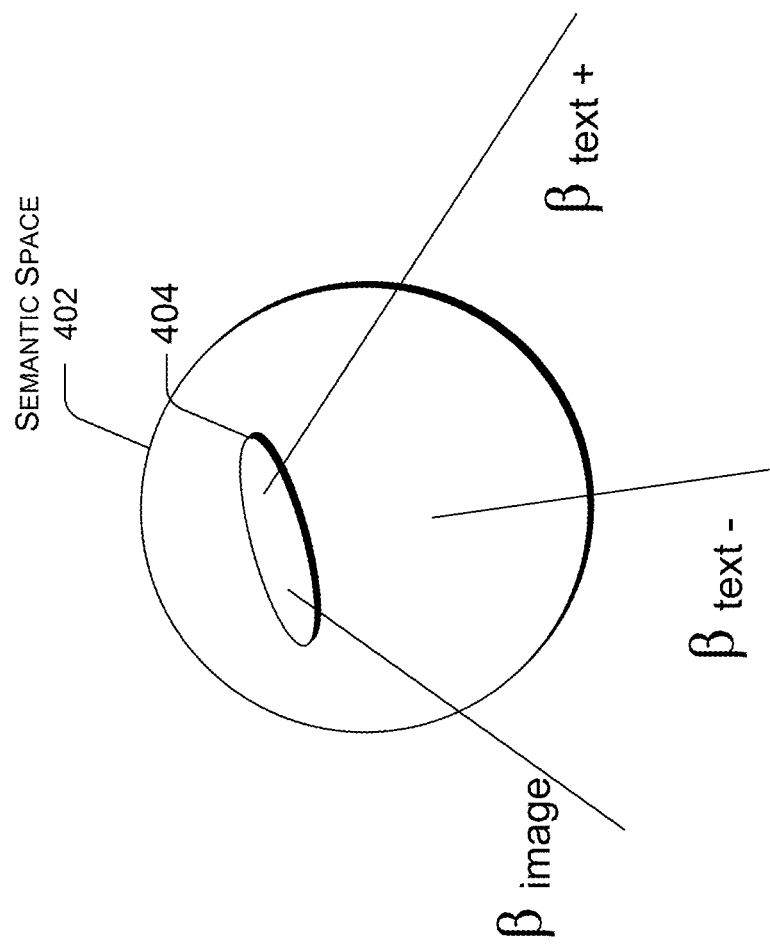
FIG. 4 is an example illustration showing the mapping of an image vector and a text vector into a semantic space.

FIG. 4 is an example illustration showing the mapping of an image vector such as image vector 306 and a text vector such as text vector 308 into a semantic space 402. Using a DMSM such as DMSM 230 and/or 300, the image vector 306, represented as β image, is mapped into the semantic space 402. In some examples, the image vector 306 and the text vector 308 are low dimensional vectors. Using a DMSM such as DMSM 230 and/or 300, the text vector 308, represented as β text+, is mapped into the semantic space 402. If another text vector 308 is available (e.g., another sentence was analyzed using the DMSM), the additional text vector 308, represented as β text−, is mapped into the semantic space 402.

When trained, the DMSM can recognize that the text vector 308, represented as β text+, is more relevant to the image vector 306 than other text vectors, such as the text vector 308, represented as β text−. If so, the sentence from which the text vector 308, represented as β text+, is considered more relevant to the image from which the image vector 306 was generated than the image from which image vector 308 was generated. The relative relevance is represented in a relevance space 404. The relevance space 404 can be determined through the training of the DMSM. In the inverse, the DMSM can recognize that the text vector 308 represented as β text−, is less relevant to the image vector 306 than the text vector text vector 308 represented as β text+. If so, the sentence from which the text vector 308, represented as β text−, is not relevant to the image from which the image vector 306 was generated. This is illustrated in FIG. 4 as having the text vector 308, represented as β text−, as being outside of the relevance space 404. In this manner, the distance between the image vector 306 and the text vector 308, represented as β text−, is too high to be considered relevant. That is the distance is outside of the relevance space 404.

In examples, for an image model such as image model 240 and/or image model 302, semantic vectors can be mapped using a rich convolutional neural network. The neural network can be fine-tuned using various data sets, such as the training set of data 238. A particular representation can be extracted from the network and stacked with additionally fully connected layers with non-linearities on top of this representation to obtain a final representation of the same size as the last layer of the text model. The parameters in these additional fully connected layers can be learned during training of a DMSM such as DMSM 230 and/or DMSM 300.

Word detectors can be trained using various technologies. As mentioned above, a weakly supervised approach can be used, and in some examples, the approach can be multiple instance learning (MIL). In MIL, for each word $w \in \mathcal{V}$, MIL takes as input sets of "positive" and "negative" bags of bounding boxes, where each bag corresponds to one image i of a set of images 117. A bag $b_i$ is said to be positive if word w is in image i's description, and negative otherwise. Intuitively, MIL performs training by iteratively selecting instances within the positive bags, followed by retraining the detector using the updated positive labels.

In some examples, a noisy-OR model of MIL can be used. In a noisy-OR version of MIL, the probability of bag $b_i$ containing word w is calculated from the probabilities of individual instances in the bag using Equation (3):

$$1 - \prod_{j \in b_i} (1 - p_{ij}^w) \tag{3}$$

where $p_{ij}^w$ is the probability that a given image region j in image i corresponds to word w. $p_{ij}^w$ can be computed using a multi-layered architecture, by computing a logistic function on top of a fully connected layer, such as an fc7 layer, which can be expressed as a fully connected fc8 layer followed by a sigmoid layer using Equation (4):

$$\frac{1}{1 + \exp(-(v_w^t \phi(b_{ij}) + u_w))} \tag{4}$$

where $\phi(b_{ij})$ is the fc7 representation for image region j in image i, and $v_w$, $u_w$ are the weights and bias associated with word w. The fully connected layers (fc6, fc7, fc8) of these networks can be expressed as convolutions to obtain a fully convolutional network. When this fully convolutional network is run over the image, a coarse spatial response map can be obtained. Each location in the response map can correspond to the response obtained by applying the original convolutional neural network ("CNN") to overlapping shifted regions of the input image (thereby effectively scanning different locations in the image for possible objects). The image can be up-sampled to make the longer side have a certain number of pixels, such as 565 pixels, which can gives a 12×12 response map at fc8 for both and can correspond to sliding a 224×224 bounding box in the up-sampled image with a stride of 32. The noisy-OR version of MIL can then be implemented on top of this response map to generate a single probability for each word for each image. In some examples, a cross entropy loss can be used.

The CNN end-to-end can be optimized with a stochastic gradient descent. One image in each batch can be used for training for 3 epochs. For initialization, a pre-trained network can be used.

Figure 5:
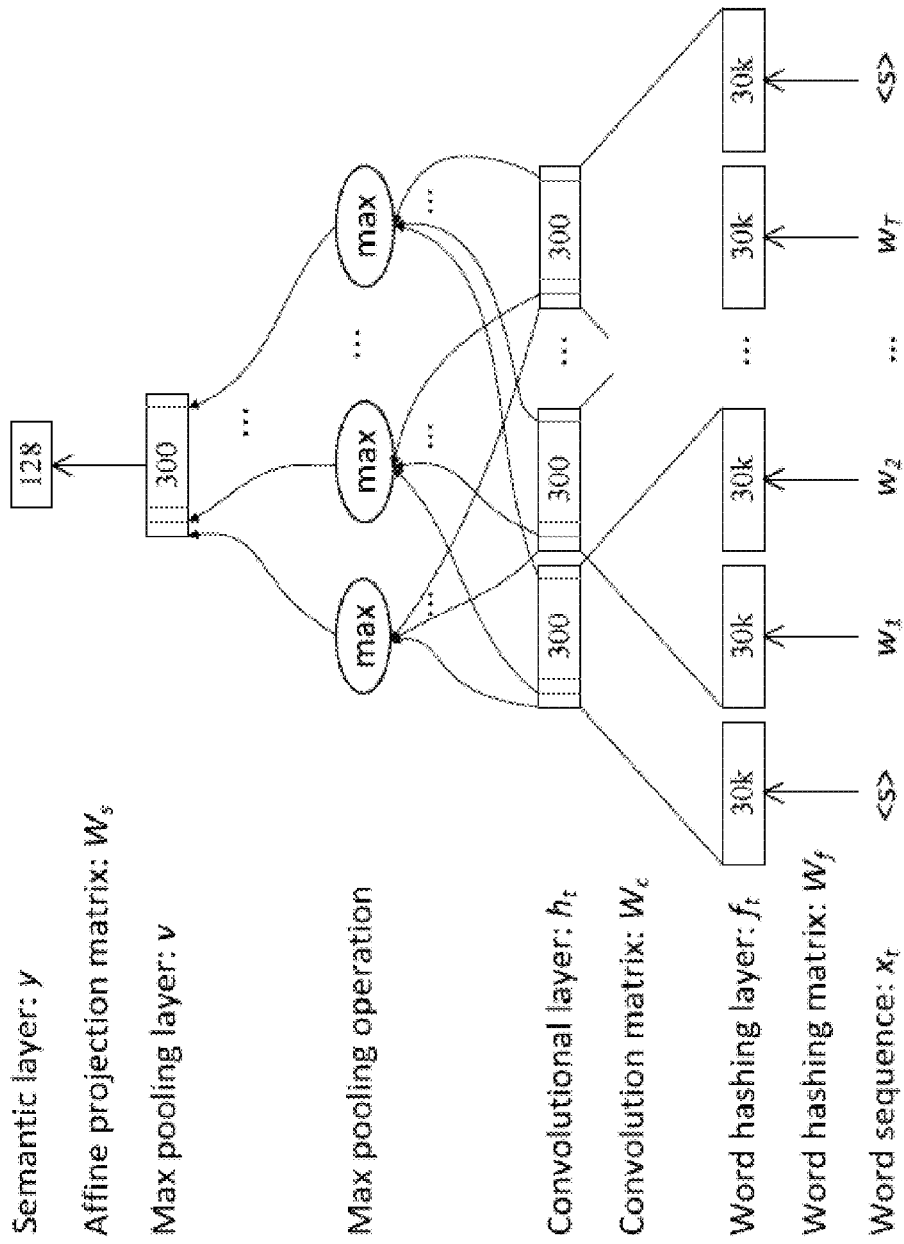
FIG. 5 is an illustration showing the generation of a text vector.

FIG. 5 is an illustration showing the generation of a text vector such as text vector 308. In some examples, the text fragments can be a full caption. The words in a caption (or one of the sentences in the set of sentences) are converted to a letter-tri-gram count vector, which uses the count distribution of context-dependent letters to represent a word. In some examples, the representation in a letter-trigram count vector can have the advantage of reducing the size of the input layer while generalizing well to infrequent, unseen, and incorrectly spelled words. The representation is forward propagated through a deep convolutional neural network to produce the semantic vector at the last layer. The architecture of the text model is illustrated in FIG. 5.

In FIG. 5, the model contains a word hashing layer fc that transforms each word into a letter-tri-gram input representation, a convolutional layer to extract local contextual features, a max-pooling layer to form a global feature vector, and a final semantic layer y to represent the high-level semantic feature vector of the input word sequence.

In examples, the word hashing layer fc transforms each word in an input word sequence $x_t$ into a feature vector using the technique called word hashing. For example, the word is represented by a count vector of its letter-tri-grams. The convolution operation can be viewed as sliding window based feature extraction. It is designed to capture the contextual features for a word. Consider a word at the t-th position in a word sequence. The word hashing feature vectors of all the context words within a window around wt are firstly concatenated to form a context window vector, and then projected to a local contextual feature vector ht, as shown in FIG. 5.

The contextual feature vectors extracted at the convolutional layer are local features, one for each word. In some examples, the contextual features are combined to obtain a global feature vector with a fixed size. For the IR task, the non-significant local features are suppressed, while only retaining the salient features that are useful for IR in the global feature vector. A max pooling operating is used. In examples, the max pooling operation can force a text model, e.g., the text model 242, to retain only the most useful local features produced by the convolutional layers. In addition to the global vector, a semantic layer can be applied to extract a high-level semantic representation, denote in FIG. 5 by y.

As noted above, a relevance can be used to determine if the text vector 308 is semantically similar to the image vector 306. In some examples, the relevance R can be defined as the cosine similarity between an image or query (Q) and a text fragment or document (D) based on their representations $y_Q$ and $y_D$ obtained using the image and text models, shown by Equation (5):

$$R(Q,D) = \cosine(y_Q, y_D) = (y_Q^T y_D)/\|y_q\|\|y_D\| $$

For a given image-text pair, the posterior probability of the text being relevant to the image can be computed via Equation (6):

$$P(D \mid Q) = \frac{\exp(\gamma R(Q, D))}{\sum_{D' \in \mathbb{D}} \exp(\gamma R(Q, D'))} \quad (6)$$

In Equation (6), γ is a smoothing factor determined using the validation set. In some examples, a smoothing factor may not be used. In other examples, the smoothing factor can be in a range from 1 to 10. In Equation (6), D denotes the set of all candidate documents (captions) which can be compared to the query (image). In some examples restricting D to one matching document D+ and a fixed number N of randomly selected non-matching documents D− can be efficient or effective. In further examples, using noise-contrastive estimation could further improve results. Thus, for each image, one relevant text fragment and N non-relevant fragments can be selected to compute the posterior probability. N can be set to a range of particular numbers, and can be in a range of from 40 to 60, and can be 50. During training, the model parameters Λ can be adjusted to minimize the negative log posterior probability that the relevant captions are matched to the images, as shown in Equation (7):

$$L(\Lambda) = -\log \prod_{(Q,D^+)} P(D^+ \mid Q) \quad (7)$$

Figure 6B:
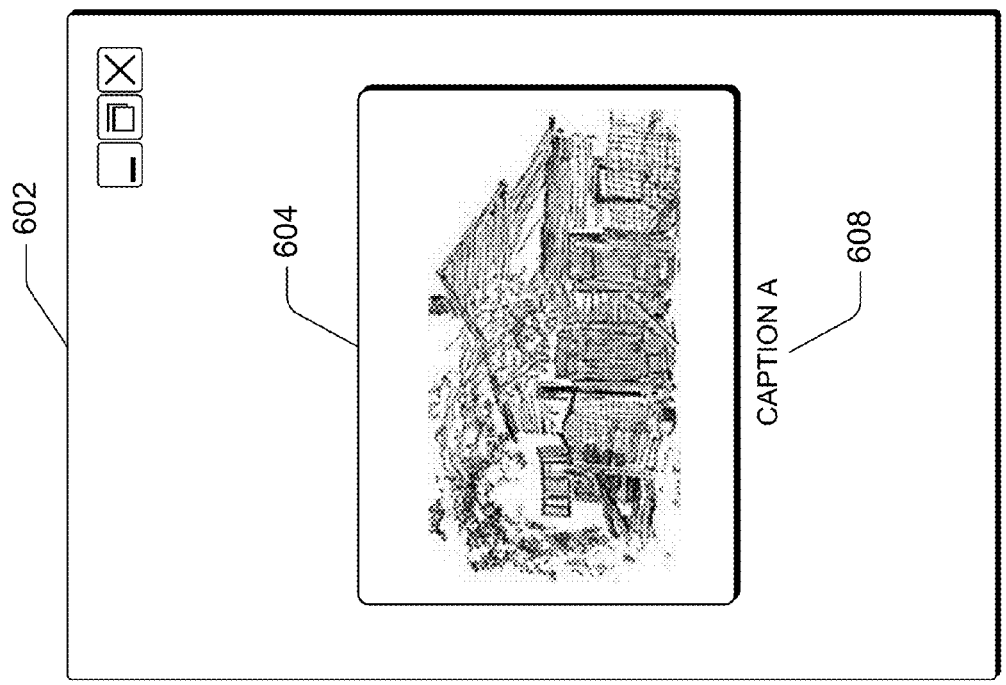
FIGS. 6A-6D are illustrations showing an example user interface for use in conjunction with various aspects of a DMSM to generate a caption for an image.
Figure 6A:
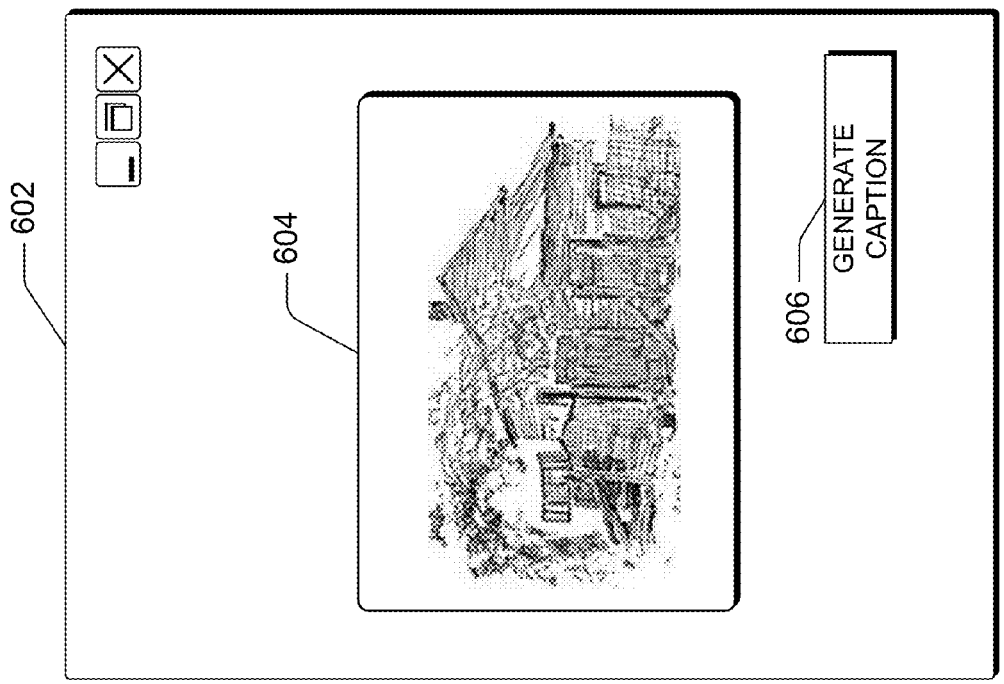
Figure 6D:
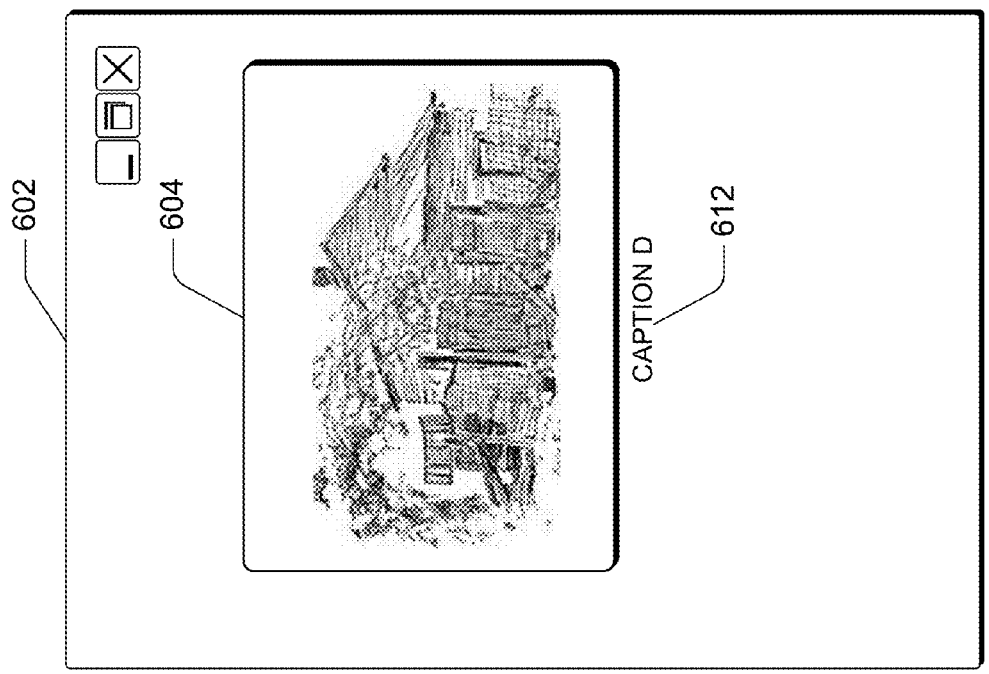

FIGS. 6A and 6B are user interface diagrams showing the use of DMSM 230 to generate a caption for an image. In FIG. 6A, a user interface 602 has rendered therein an image 604. As illustrated in FIG. 6A, the image 604 does not include a caption. To provide a caption, the user interface 602 can include a generate caption input 606. The generate caption input 606 can be configured to receive an input from an entity or user to generate a caption for the image 604.

When selected, the generate caption 606 can invoke a caption generator such as the caption generator 224 of FIG. 2. The caption generator 224 can invoke the detector 226 to determine the words 246 associated with the image 604. The sentence generator 228 can receive the words 246 and can generate a set of sentences from the words 246. The sentence re-ranker 232 can receive the set of sentences and re-rank the sentences based on the relevance of the sentences to the image 604 using the DMSM 230. The most relevant sentence can be outputted as a caption, illustrated in FIG. 6B as the caption 608. If accepted, the caption 608 is thereafter associated with the image 604.

Figure 6C:
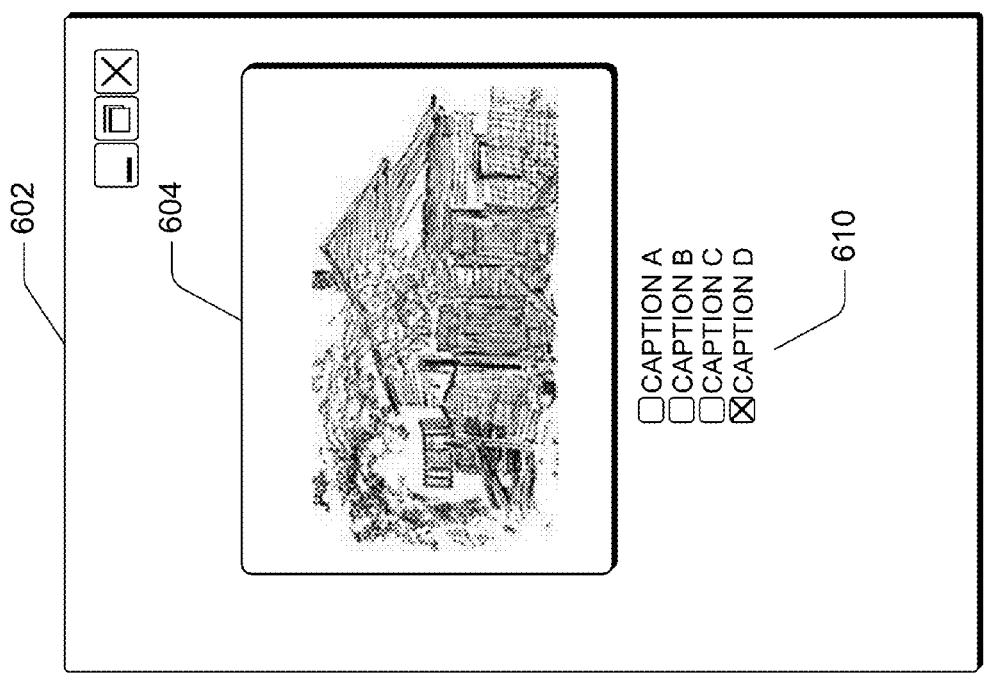

In some examples, more than one relevant sentence can be outputted for acceptance. FIG. 6C is an illustration of the user interface 602 in which more than one relevant sentence is displayed. In FIG. 6C, the user interface 602 has rendered therein caption list 610. The caption list 610 can be a certain number of possible captions. In some examples, the caption list 610 can be ordered based on relevancy (e.g. the most relevant caption listed first). The accepted caption in the caption list 610 can be thereafter associated with the image 604 and stored as such in an image file. In FIG. 6C, the caption D has been selected and would result in the caption D as the caption, illustrated in FIG. 6D as the caption 612.

Example Processes

Figure 7:
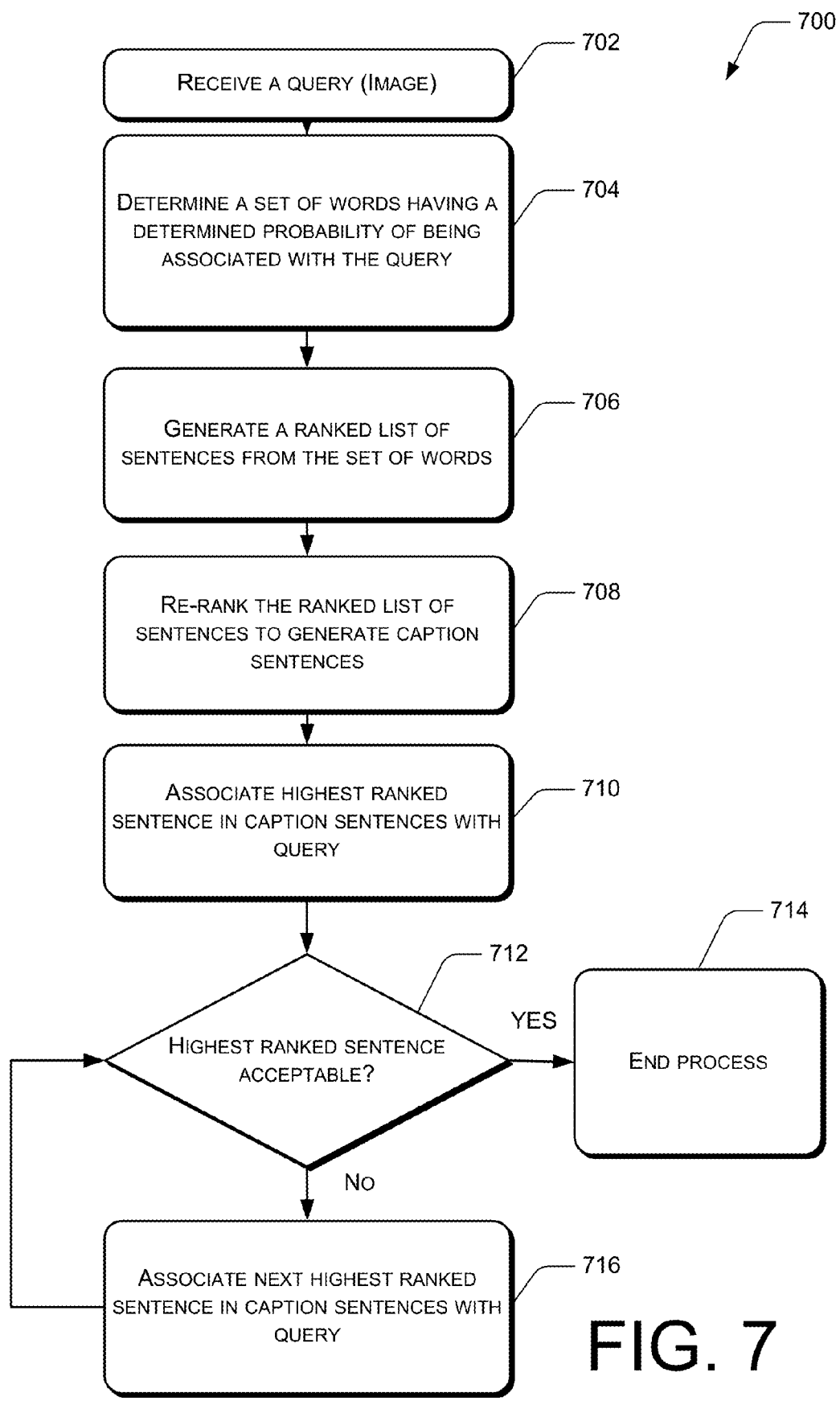
FIG. 7 is a flow diagram depicting an example caption generation routine.
Figure 8:
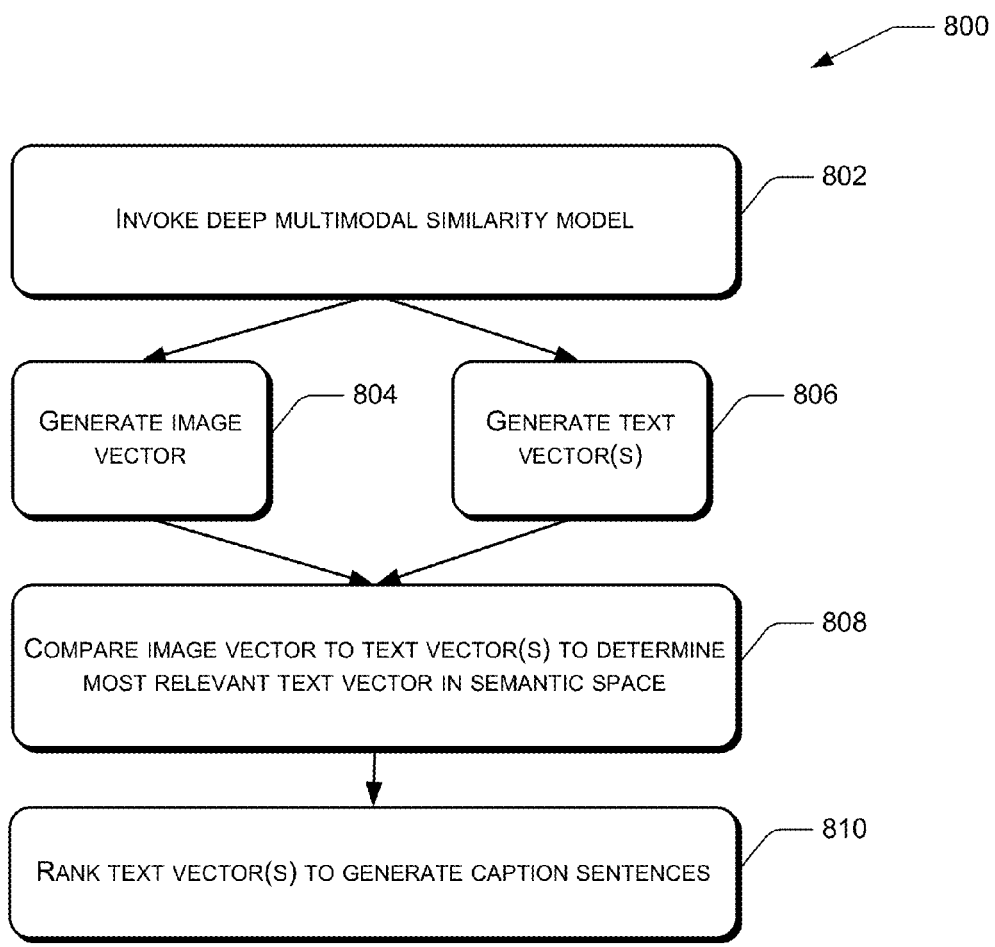
FIG. 8 is a flow diagram an example routine for a deep multimodal similarity model.

FIGS. 7 and 8 are flow diagrams depicting aspects of discovering semantic similarities between images and text, which can include performing image search using a textual query, performing text search using an image as a query, and/or generating captions for images. The operations of the routines disclosed herein are not necessarily presented in any particular order and that performance of some or all of the operations in an alternative order(s) is possible and is contemplated. The operations have been presented in the demonstrated order for ease of description and illustration.

Operations can be added, omitted, and/or performed simultaneously, without departing from the scope of the appended claims.

Some or all operations of the routines, and/or substantially equivalent operations, can be performed by execution of computer-executable instructions included on computer-readable media, as defined herein. The term "computer-executable instructions," and variants thereof, as used in the description and claims, is used expansively herein to include routines, applications, application modules, program modules, programs, components, data structures, algorithms, and the like.

Thus, it should be appreciated that the logical operations described herein are implemented (1) as a sequence of computer implemented acts or program modules running on a computing system and/or (2) as interconnected machine logic circuits or circuit modules within the computing system. The example is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof. The operations of the routines are described herein below as being implemented, at least in part, by the caption generator 224. One or more of the operations of the routines described herein, and the other operations described herein, can alternatively or additionally be implemented, at least in part, by other similarly configured components in a consumer device 124, the distributed computing resources 102 including one or more devices 106, and/or one or more devices 200, even if not specifically designated in the figures.

FIG. 7 depicts an example caption generation routine 700. At block 702, a query, e.g., an image 244, is received. The query can be received at a computer 106 or 200 executing the semantic similarity framework 222 including caption generator 224. In some examples, the caption generator 224 can be trained using the training set of data 238 or the query can be part of the training process. The disclosed subject matter is not limited to any particular instance.

At block 704, the caption generator 224 can invoke the detector 226 to generate a set of words having a determined probability of being associated with the query. The probability can be determined based on the training associated with the training set of data 238. The probability can also be generated using other technologies, such as, but not limited to, image scanning and recognition. In some examples, the query can be analyzed by the detector 226 by finding similar images in the training set of data 238 and return one or more words 232 associated with the similar images. In some examples, the number of possible words 232 can be limited to reduce the sample set of the training set of data 238. In some examples, the number of possible words 246 from which captions can be generated can be limited by a pre-determined amount, e.g. to approximately 500 words, 1000 words, 1500 words, etc.

At block 706, the caption generator 224 can invoke the sentence generator 228 to generate a ranked set (or list) of sentences from the set of words. In some examples, the set of sentences is not ranked. The sentence generator 228 can receive as an input the possible words associated with the query from the detector 226 and generate one or more sentences from the possible words. It should be noted that the presently disclosed subject matter is not limited to any particular length, style, or substance of sentence. Further, in some examples, the sentence generator 228 can generate phrases as well. There can be various technologies or methodologies to generate sentences from the words 246. In some examples, a maximum entropy ("ME") language model ("LM") can be used.

At block 708, the caption generator 224 can invoke the sentence re-ranker 232 to re-rank the ranked set of sentences to generate caption sentences. If the set of sentences of block 706 are not ranked, the block 708 can rank the set of sentences to generate caption sentences. The sentence re-ranker 232 can use a deep multimodal similarity model ("DMSM") such as DMSM 118, 230, and/or 300. In some examples, the DMSM models global similarity between images and text. In examples, the DMSM learns two neural networks that map images and text fragments to vector representations of the same size. The similarity between images and text is measured by measuring the cosine similarity between their corresponding vectors.

At block 710, the caption generator 224 can associate the highest ranked sentence in the caption sentences with the query.

At block 712, a semantic similarity framework such as semantic similarity framework 116 and/or 222 can make a determination as to whether or not the highest ranked sentence is acceptable. The acceptance of the highest ranked sentence can be received from a manual or automatic operation. For example, an input can be received that the highest ranked sentence is not accepted. In another example, the highest ranked sentence can be analyzed against other criteria, such as bias, to determine its acceptance. In one example, the image can be analyzed to determine foreground and background images. The foreground images can be given weight over the background images. The highest ranked sentence can be primarily composed of word associated with the background images, and thus, can be unacceptable.

At block 712, if the highest ranked sentence is acceptable, the highest ranked sentence can be associated with the query and the query file can be updated with the highest ranked sentence as a caption. In other examples, a new query file can be created from the original query file, the new query file comprising the image and the highest ranked sentence. The routine 700 can end at block 714.

At block 712, if the highest ranked sentence is not acceptable, at block 716, the next highest ranked sentence in the caption sentences is associated with the query and the routine 700 continues at block 712 and can continue in the manner described above until a sentence is accepted or for a predetermined number of iterations. The routine 700 can be used in conjunction with a caption generator interface, such as the user interface 602 of FIGS. 6A-6C.

FIG. 8 is a flow diagram depicting an example routine 800 for a deep multimodal similarity model, such as the DMSM 118, 230, and/or 300.

At block 802, the sentence re-ranker 232 invokes a deep multimodal similarity model. The DMSM compares an image vector of the query to one or more text vector(s) from the query. The DMSM uses a pair of neural networks, an image model such as image model 240 and/or image model 302 and a text model such as text model 242 and/or text model 304, one for mapping each input modality to a common semantic space, which are trained jointly. Relevance is based on a pre-defined similarity between the image vector and the one or more text vectors in the same semantic space, illustrated by way of example in FIG. 4.

At block 804, the DMSM generates the image vector using the image model.

At block 806, the DMSM generates the one or more text vectors using the text model.

At block 808, the DMSM compares the image vector to the one or more text vectors to determine the most relevant text vector in the semantic space.

At block 810, the DMSM ranks the text vectors to generator caption sentences. In some examples, the highest ranked caption sentence is returned. In other examples, some or all of the caption sentences are returned. In some examples, a caption list is generated, whereby the sentence associated with the most relevant text vector is listed first and the remaining sentences are listed in descending relevance order.

Figure 9:
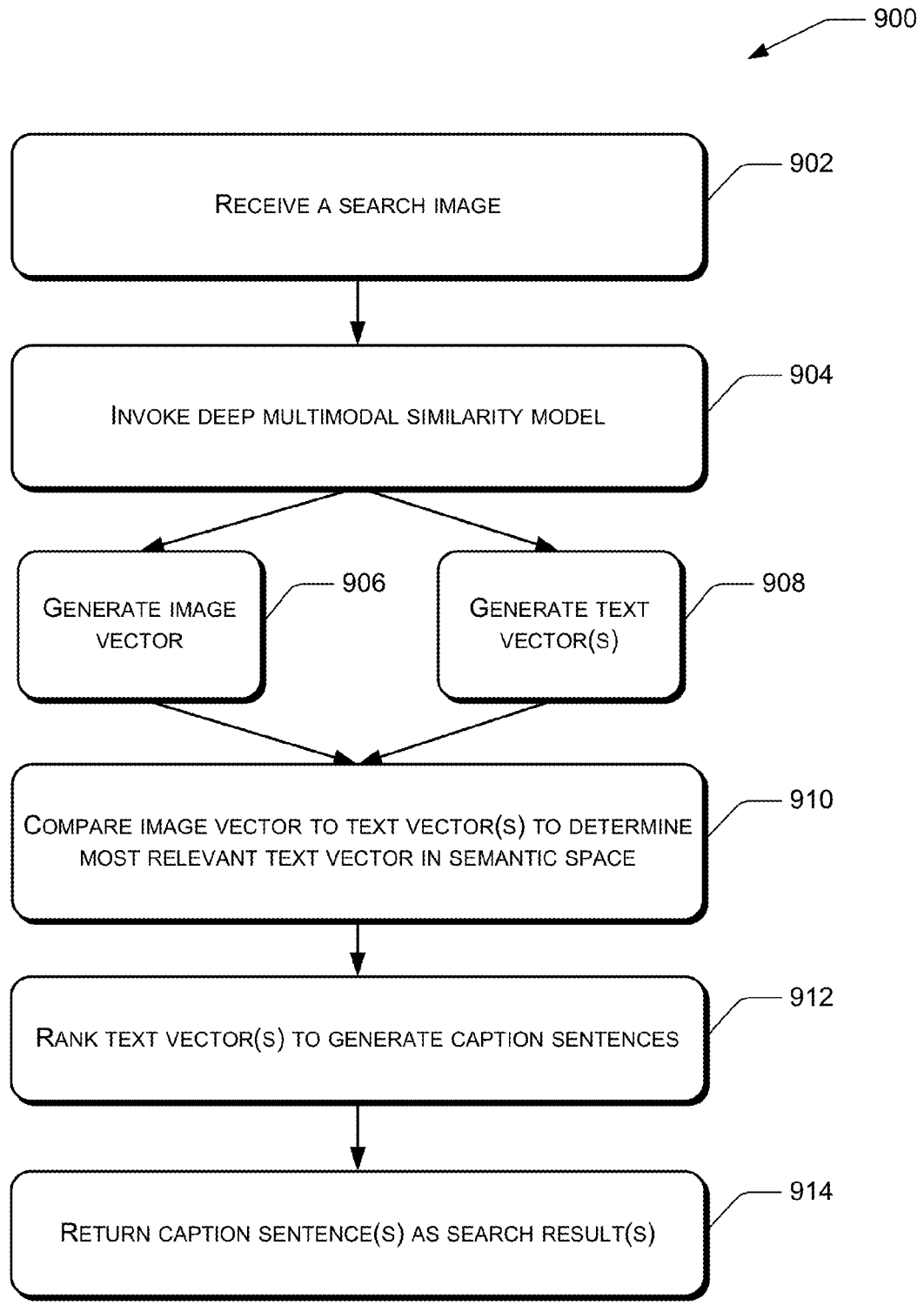
FIG. 9 is a flow diagram of an example routine for a using a deep multimodal similarity model to perform a search using an image.

FIG. 9 is a flow diagram of an example routine for performing a search using a deep multimodal similarity model, such as the DMSM 118, 230, and/or 300. In some examples, an image can be the subject of a search, whereby text associated with the captions can be returned as search results in addition to, or in lieu of, captioning for the image.

At block 902, an image 244 is received. The image 244 can be an image that a user or other entity wishes to search. In these examples, configurations disclosed herein can be used as a search engine whereby caption sentences are used as search results.

At block 904, the sentence re-ranker 232 invokes a deep multimodal similarity model, such as the DMSM 118, 230, and/or 300. The DMSM compares an image vector of the image 244 to one or more text vector(s) from the query. The DMSM uses a pair of neural networks, an image model such as image model 240 and/or image model 302 and a text model such as text model 242 and/or text model 304, one for mapping each input modality to a common semantic space, which are trained jointly. Relevance can be based on a pre-defined similarity between the image vector and the one or more text vectors in the same semantic space, illustrated by way of example in FIG. 4.

At block 906, the DMSM generates the image vector using the image model.

At block 908, the DMSM generates one or more text vectors using the text model.

At block 910, the DMSM compares the image vector to the one or more text vectors to determine the most relevant text vector in the semantic space.

At block 912, the DMSM ranks the text vectors to generator caption sentences. In some examples, a ranked list of caption sentences is generated, whereby the caption sentence associated with the most relevant text vector is listed first and the remaining caption sentences are listed in descending relevance order.

At block 914, one or more of the caption sentences are provided to a user or other requesting entity as search results. In some examples, the highest ranked caption sentence is returned. In other examples, some or all of the caption sentences are returned.

Example Clauses

A: A device comprising: a processor; and a computer-readable medium in communication with the processor, the computer-readable medium including modules comprising a caption generator module configured to receive a query, the query comprising an image, a detector module configured to detect a set of words with a determined probability to be associated with the query, a sentence generator module configured to generate a set of sentences from the set of words, a sentence re-ranker module configured to rank the set of sentences to generate caption sentences by using a deep multimodal similarity model module, the deep multimodal similarity model module configured to use an image model to generate an image vector from the query and a text model to generate a plurality of text vectors from the set of sentences, and the deep multimodal similarity module further configured to associate the most relevant sentence of the caption sentences as a caption for the image.

B: A device as paragraph A describes, wherein to generate the plurality of text vectors from the set of sentences, the deep multimodal similarity detector module is further configured to convert each word of the plurality of sentences of the set of sentences to a letter-trigram count vector and propagate forward the letter-trigram count vector through a deep convolutional neural network to produce a semantic vector.

C: A device as either paragraph A or B describes, wherein the deep multimodal similarity detector module is further configured to map the image vector and the plurality of text vectors into a semantic space.

D: A device as any of paragraphs A-C describes, wherein the deep multimodal similarity detector module is further configured to establish a relevance space in the semantic space to determine relevance of the plurality of text vectors to the image vector, whereby text vectors in the relevance space of the semantic space are determined to be more relevant than text vectors outside of the relevance space of the semantic space.

E: A device as any of paragraphs A-D describe, wherein the deep multimodal similarity detector module is further configured to determine an order of relevance for the caption sentences by measuring a cosine similarity between the image vector and one or more of the plurality of text vectors.

F: A device as any of paragraphs A-E describe, wherein to detect a set of words, the detector module is configured to determine a number of common words found in training captions.

G: A device as any of paragraphs A-F describe, wherein the number of common words found in training captions is set at a determined number of words.

H: A device as any of paragraphs A-G describe, wherein the detector module is further configured to teach a set of detectors using a weakly-supervised approach of multiple instance learning, wherein the weakly-supervised approach of multiple instance learning comprises iteratively selecting instances within a set of positive bags of bounding boxes.

I: A method, comprising receiving an image; detecting a set of words with a determined probability to be associated with the image; generating a ranked set of sentences from the set of words, the ranked set of set of sentences comprising a plurality of sentences in a ranked order; re-ranking the ranked set of sentences by using a deep multimodal similarity model comprising an image model and a text model to generate caption sentences; and associating a relevant sentence of the caption sentences as a caption for the image.

J: A method as paragraph I describes, wherein re-ranking the ranked set of sentences by using the deep multimodal similarity model comprising the image model and the text model to generate caption sentences comprises: generating an image vector from the image using the image model; and generating a plurality of text vectors from the ranked set of sentences using the text model.

K: A method as either paragraphs I or J describe, wherein generating the plurality of text vectors from the image comprises: converting each word of the plurality of sentences of the ranked set of sentences to a letter-trigram count vector; and propagating forward the letter-trigram count vector through a deep convolutional neural network to produce a semantic vector.

L: A method as any of paragraphs I-K describe, further comprising mapping the image vector and the plurality of text vectors into a semantic space.

M: A method as any of paragraphs I-L describe, further comprising establishing a relevance space in the semantic space to determine relevance of the plurality of text vectors to the image vector, whereby text vectors in the relevance space of the semantic space are determined to be more relevant than text vectors outside of the relevance space of the semantic space.

N: A method as any of paragraphs I-M describe, further comprising determining an order of relevance for the caption sentences by measuring a cosine similarity between the image vector and one or more of the plurality of text vectors.

O: A method as any of paragraphs I-N describe, wherein the set of words comprises determining a number of common words found in training captions.

P: A method as any of paragraphs I-O describe, wherein the number of common words found in training captions is no greater than one thousand words.

Q: A method as any of paragraphs I-P describe, wherein detecting the set of words comprises teaching a set of detectors using a weakly-supervised approach of multiple instance learning.

R: A method as any of paragraphs I-Q describe, wherein the weakly-supervised approach of multiple instance learning comprises iteratively selecting instances within a set of positive bags of bounding boxes.

S: A method as any of paragraphs I-R describe, further comprising generating an image file comprising the image and the relevant sentence as the caption.

T: A computer-readable medium having thereon computer-executable instructions that responsive to execution configure a computer to perform a method as any of paragraphs I-S describes.

U: A device or system comprising: a processor; and a computer-readable medium coupled to the processor, the computer-readable medium including instructions to configure one or more devices to perform a method as any of paragraphs I-S describes.

V: A device or system comprising: means for processing; and means for storing coupled to the means for processing, the means for storing, storing instructions to configure one or more devices to perform a method as any of paragraphs I-S describes.

T: A computer-readable medium having computer-executable instructions thereupon that, when executed by a computer, cause the computer to: receive a set of sentences generated from a set of words associated with an image, rank the set of sentences to generate caption sentences by using a deep multimodal similarity model, the deep multimodal similarity model comprising an image model to generate an image vector from the query and a text model to generate a plurality of text vectors from the set of sentences, determine a relevant sentence of the caption sentences by comparing the image vector and the plurality of text vectors, with a sentence associated with a text vector having a highest similarity determined to be the relevant sentence, associate the relevant sentence of the caption sentences as a caption for the image, and create an image file comprising the image and the relevant sentence.

U. A method, comprising receiving a search image, detecting a set of words with a determined probability to be associated with the search image, generating a ranked set of sentences from the set of words, the ranked set of set of sentences comprising a plurality of sentences in a ranked order, re-ranking the ranked set of sentences by using a deep multimodal similarity model comprising an image model and a text model to generate a ranked list of caption sentences, and providing the ranked list of caption sentences as a search result for the search image.

Conclusion

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A device comprising:
   a processor; and
   a computer-readable medium in communication with the processor, the computer-readable medium including modules comprising:
   a caption generator module configured to receive a query, the query comprising an image,
   a detector module configured to detect a set of words with a determined probability to be associated with the query, a sentence generator module configured to generate a set of sentences from the set of words, a sentence re-ranker module configured to rank the set of sentences to generate caption sentences by using a deep multimodal similarity model module, the deep multimodal similarity model module configured to use an image model to generate an image vector from the query and a text model to generate a plurality of text vectors from the set of sentences, and the deep multimodal similarity module further configured to associate the most relevant sentence of the caption sentences as a caption for the image.

2. A device as claim 1 recites, wherein to generate the plurality of text vectors from the set of sentences, the deep multimodal similarity detector module is further configured to:

convert each word of the plurality of sentences of the set of sentences to a letter-trigram count vector; and propagate forward the letter-trigram count vector through a deep convolutional neural network to produce a semantic vector.

3. A device as claim 1 recites, wherein the deep multimodal similarity detector module is further configured to map the image vector and the plurality of text vectors into a semantic space.

4. A device as claim 3 recites, wherein the deep multimodal similarity detector module is further configured to establish a relevance space in the semantic space to determine relevance of the plurality of text vectors to the image vector, whereby text vectors in the relevance space of the semantic space are determined to be more relevant than text vectors outside of the relevance space of the semantic space.

5. A device as claim 4 recites, wherein the deep multimodal similarity detector module is further configured to determine an order of relevance for the caption sentences by measuring a cosine similarity between the image vector and one or more of the plurality of text vectors.

6. A device as claim 1 recites, wherein to detect a set of words, the detector module is configured to determine a number of common words found in training captions.

7. A device as claim 6 recites, wherein the number of common words found in training captions is set at a determined number of words.

8. A device as claim 1 recites, wherein the detector module is further configured to teach a set of detectors using a weakly-supervised approach of multiple instance learning, wherein the weakly-supervised approach of multiple instance learning comprises iteratively selecting instances within a set of positive bags of bounding boxes.

9. A method, comprising:
receiving an image;
detecting a set of words with a determined probability to be associated with the image;
generating a ranked set of sentences from the set of words, the ranked set of sentences comprising a plurality of sentences in a ranked order;
re-ranking the ranked set of sentences by using a deep multimodal similarity model comprising an image model and a text model to generate caption sentences; and
associating a relevant sentence of the caption sentences as a caption for the image.

10. A method as claim 9 recites, wherein re-ranking the ranked set of sentences by using the deep multimodal similarity model comprising the image model and the text model to generate caption sentences comprises:

generating an image vector from the image using the image model; and generating a plurality of text vectors from the ranked set of sentences using the text model.

11. A method as claim 10 recites, wherein generating the plurality of text vectors from the image comprises:

converting each word of the plurality of sentences of the ranked set of sentences to a letter-trigram count vector; and propagating forward the letter-trigram count vector through a deep convolutional neural network to produce a semantic vector.

12. A method as claim 10 recites, further comprising mapping the image vector and the plurality of text vectors into a semantic space.

13. A method as claim 12 recites, further comprising establishing a relevance space in the semantic space to determine relevance of the plurality of text vectors to the image vector, whereby text vectors in the relevance space of the semantic space are determined to be more relevant than text vectors outside of the relevance space of the semantic space.

14. A method as claim 13 recites, further comprising determining an order of relevance for the caption sentences by measuring a cosine similarity between the image vector and one or more of the plurality of text vectors.

15. A method as claim 9 recites, wherein the set of words comprises determining a number of common words found in training captions.

16. A method as claim 15 recites, wherein the number of common words found in training captions is no greater than one thousand words.

17. A method as claim 9 recites, wherein detecting the set of words comprises teaching a set of detectors using a weakly-supervised approach of multiple instance learning.

18. A method as claim 17 recites, wherein the weakly-supervised approach of multiple instance learning comprises iteratively selecting instances within a set of positive bags of bounding boxes.

19. A method as claim 9 recites, further comprising generating an image file comprising the image and the relevant sentence as the caption.

20. A computer storage medium having computer-executable instructions thereupon that, when executed by a computer, cause the computer to:

receive a set of sentences generated from a set of words associated with an image, rank the set of sentences to generate caption sentences by using a deep multimodal similarity model, the deep multimodal similarity model comprising an image model to generate an image vector from the query and a text model to generate a plurality of text vectors from the set of sentences, determine a relevant sentence of the caption sentences by comparing the image vector and the plurality of text vectors, with a sentence associated with a text vector having a highest similarity determined to be the relevant sentence, associate the relevant sentence of the caption sentences as a caption for the image, and create an image file comprising the image and the relevant sentence.

21. A method, comprising:
receiving a search image;
detecting a set of words with a determined probability to be associated with the search image;

generating a ranked set of sentences from the set of words, the ranked set of sentences comprising a plurality of sentences in a ranked order;

re-ranking the ranked set of sentences by using a deep multimodal similarity model comprising an image model and a text model to generate a ranked list of caption sentences; and providing the ranked list of caption sentences as a search result for the search image.

* * * * *